United States Patent
Childress

(10) Patent No.: US 12,051,094 B2
(45) Date of Patent: *Jul. 30, 2024

(54) CUSTOMER SENTIMENT MONITORING AND DETECTION SYSTEMS AND METHODS

(71) Applicant: Macorva Inc., Bellaire, TX (US)

(72) Inventor: Nathan Childress, Bellaire, TX (US)

(73) Assignee: Macorva Inc., Bellaire, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/164,683

(22) Filed: Feb. 1, 2021

(65) Prior Publication Data

US 2021/0241327 A1  Aug. 5, 2021

Related U.S. Application Data

(60) Provisional application No. 62/969,534, filed on Feb. 3, 2020.

(51) Int. Cl.
| | |
|---|---|
| *G06Q 30/0282* | (2023.01) |
| *G06F 3/0481* | (2022.01) |
| *G06Q 10/0639* | (2023.01) |
| *G06Q 10/067* | (2023.01) |
| *G06Q 30/0203* | (2023.01) |
| *G06Q 30/0204* | (2023.01) |

(52) U.S. Cl.
CPC ....... *G06Q 30/0282* (2013.01); *G06F 3/0481* (2013.01); *G06Q 10/06393* (2013.01); *G06Q 10/06398* (2013.01); *G06Q 10/067* (2013.01); *G06Q 30/0203* (2013.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| 8,813,154 | B1 * | 8/2014 | Sivertsen | H04N 21/8146 |
| | | | | 235/462.07 |
| 2003/0101091 | A1 * | 5/2003 | Levin | G06Q 10/06398 |
| | | | | 705/7.42 |
| 2005/0154981 | A1 * | 7/2005 | Wang | G06Q 30/0203 |
| | | | | 715/236 |

(Continued)

OTHER PUBLICATIONS

Tsekouras, "The Effect of Rating Scale Design on Extreme Response Tendency in Consumer Product Ratings," 2017, International Journal of Electronic Commerce, vol. 21, No. 2, pp. 270-296 (Year: 2017).*

(Continued)

*Primary Examiner* — Ivan R Goldberg
(74) *Attorney, Agent, or Firm* — Polsinelli PC

(57) ABSTRACT

The present technology discloses methods, systems, and non-transitory computer-readable media for receiving ratings data, the received ratings data comprising responses to a survey associated with one or more customers of an enterprise and presenting a fixed number of attributes; aggregating the received ratings data; generating a report based on the aggregated ratings data; and generating a navigable interface comprising the generated report, the navigable interface accessible to an authorized user and comprising tabs, each tab interactable to display a respective portion of the generated report.

18 Claims, 24 Drawing Sheets

(56) References Cited

U.S. PATENT DOCUMENTS

| | | | | |
|---|---|---|---|---|
| 2006/0015393 | A1* | 1/2006 | Eisma | G06Q 10/06 705/7.14 |
| 2009/0106080 | A1* | 4/2009 | Carrier | G06Q 30/0203 235/376 |
| 2010/0121686 | A1* | 5/2010 | Mahadevan | G06Q 10/06 705/7.39 |
| 2011/0076663 | A1* | 3/2011 | Krallman | G09B 7/00 434/362 |
| 2014/0143025 | A1* | 5/2014 | Fish | G06Q 10/06398 705/7.42 |
| 2015/0317676 | A1* | 11/2015 | Reid | G06Q 30/0255 705/14.53 |
| 2016/0092822 | A1* | 3/2016 | Lavoie | G09B 7/00 705/7.42 |
| 2017/0236081 | A1* | 8/2017 | Grady Smith | G06Q 10/0637 705/7.36 |
| 2019/0244152 | A1* | 8/2019 | Yan | G06Q 10/06398 |
| 2019/0385111 | A1* | 12/2019 | Piccolo | G06F 21/31 |
| 2021/0073835 | A1* | 3/2021 | Rogante | G06N 5/003 |

OTHER PUBLICATIONS

Shrestha et al, "Improving Employee Performance Appraisal Method through Web-Based Appraisal Support System: System Development from the Study on Thai Companies," 2007, IEICE-Transactions on Information and Systems, vol. 90, No. 10, pp. 1621-1629 (Year: 2007).*

Arase, "OPA Browser: A Web Browser for Cellular Phone Users," 2007, In Proceedings of the 20th annual ACM symposium on User interface software and technology, pp. 71-80 (Year: 2007).*

* cited by examiner

| Macorva | Home | Org Chart | Reports | Configure |

Institution Settings   Users

2017 Q4
COMPLETE

452 / 708 63.8%
Submitted

Results Summary

View Org Chart
With Individual Results

Employee Highlights

Table w/ all Data

Salary Report

2018 Q1
COMPLETE

452 / 708 63.8%
Submitted

Results Summary

View Org Chart
With Individual Results

Employee Highlights

Table w/ all Data

Salary Report

2018 Q2
COMPLETE

452 / 708 63.8%
Submitted

Results Summary

View Org Chart
With Individual Results

Employee Highlights

Table w/ all Data

Salary Report

2018 Q3
IN PROGRESS

452 / 708 63.8%
Submitted

2018 Q4
SCHEDULED

Survey Settings

Update Org Chart

Use Existing Org Chart

← See More

FIG. 6

Department Report

Marketing ▼   Q3 2018 vs Q3 2017 ▼

Inter-Department Ratings  ← 710

| Other Department | They Rate Marketing | | Marketing Rates Them | |
| --- | --- | --- | --- | --- |
| | Q3 2018 | Q2 2018 | Q3 2018 | Q2 2018 |
| Company Average | 8.0 | 7.1 | 8.0 | 7.1 |
| Marketing | 8.3 | 7.7 | 8.3 | 7.7 |
| Sales | 7.6 | 8.4 | 7.6 | 8.4 |
| R&D | 7.4 | 7.2 | 7.4 | 7.2 |
| Operations | 7.6 | 9.5 | 7.6 | 9.5 |
| Manufacturing | | 7.6 | | 7.6 |
| Human Resources | 7.8 | 9.3 | 7.8 | 9.3 |

Some values may not be reported to ensure anonymity.

Department Statistics  ← 720

| | Q3 2018 | Q2 2018 | % Change |
| --- | --- | --- | --- |
| Size | 670 | 631 | 6.2% |
| Engagement | 74.2% | 71.2% | 4.2% |
| Happiness | 65.3% | 60.1% | 8.7% |
| Completion | 43.3% | 57.9% | -25.2% |
| Average intradepartment rating | 7.2 | 7.2 | 0% |

FIG. 7A

ABIO Report Table

All Departments

| ID | Full Name | Department | Overall Score | n | Above Score | n | Below Score | n | Inside Score | n | Outside Score | n |
|---|---|---|---|---|---|---|---|---|---|---|---|---|
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |
| 120 | Johnny Appleseed | Marketing | 7.2 | >5 | 7.7 | >5 | insig. | <5 | 8.5 | >75 | 9.5 | >5 |
| 120 | Johnny Appleseed | Marketing | 9.5 | >75 | 8.5 | >75 | 9.5 | >75 | 9.5 | >75 | 7.7 | >5 |

Page 1 2 3 4 5 ... 25 26 27

Print Full Table

Print Without Highlights

CUSTOMER SENTIMENT MONITORING AND DETECTION SYSTEMS AND METHODS

CROSS-REFERENCE TO RELATED APPLICATIONS

This application claims priority to U.S. Provisional Patent Application No. 62/969,534, filed on Feb. 3, 2020, entitled "Customer Sentiment Monitoring and Detection Systems and Methods," the content of which is incorporated herein by reference in its entirety.

TECHNICAL FIELD

Embodiments of the present disclosure are generally related to methods, systems, and non-transitory computer-readable media for determining customer sentiment ratings.

BACKGROUND

Customer experience data presents a great opportunity and challenge for today's operations. While understanding customer experience can lead to improvements in all aspects of a business's customer-facing practices, managing, aggregating, storing, and retrieving customer experience data is difficult. Cohesive treatment of customer experience data, from acquisition to analysis, could produce streamlined and intuitive reports for communicating actionable information to authorized users, such as operations managers, etc., and increase business efficiency while providing a more robust and customer-friendly market experience.

It is with these observations in mind, among others, that aspects of the present disclosure were concerned and developed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example user interface, according to embodiments of the present technology;

FIGS. 7A-B illustrate example reporting interfaces for departments, according to embodiments of the present technology;

FIG. 9 illustrates an example reporting interface for a team, according to embodiments of the present technology;

FIGS. 13-20 illustrate an example graphical user interface (GUI) for an individual, team, or department according to embodiments of the present technology;

DETAILED DESCRIPTION

Figure 1:
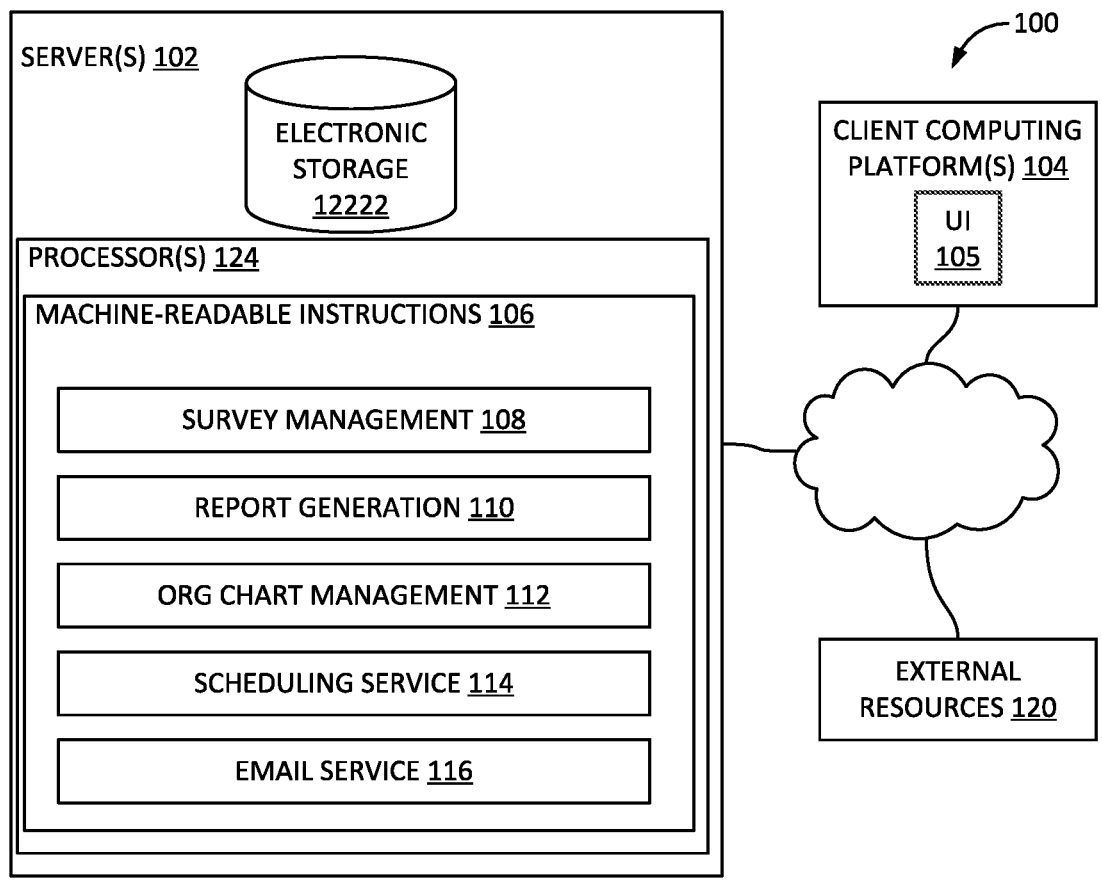
FIG. 1 illustrates a system architecture for monitoring and detecting employee sentiment, according to embodiments of the present technology.

The disclosure of the present technology will proceed as follows: first, the disclosure will describe a technology for determining workforce sentiment ratings. Second, the disclosure will describe a technology for determining customer sentiment ratings. It is these methods, systems, and non-transitory computer-readable media for determining customer sentiment ratings that are the focus of the claims.

The disclosure continues with a description of a technology for determining workforce sentiment ratings.

One aspect of the present disclosure relates to a cloud computing based feedback and rating system provided over a web interface enabling employees to anonymously rate each other. As used in this disclosure, "employee" is understood to refer to any member of a workforce in any capacity; "supervisor" is understood to refer to any employee under whom other employees work and/or to whom other employees report; and, "coworker" refers to other employees within the same workforce as a referenced employee. Each employee (e.g., including supervisors, managers, executives, associates, etc.) may be given a rating which can be used to determine trends for each employee and/or aggregated trends across groups of employees (e.g., entire organization, department, workgroup, team, etc.).

Results of the determination may be displayed in an organizational chart ("org chart") depicting a structure and population of each employee within a company. As a result, employee sentiment across the organization can be ascertained, management is able to make informed decisions regarding promotions, demotions, raises, firings, and performance improvement plans, and Human Resources (HR) departments are able to quickly measure employee engagement across an entire organization. These decisions are typically made at the sole discretion of each supervisor, without collecting feedback from all relevant coworkers.

The employee sentiment, provided as actionable data via the displayed org chart interface, may be used for downstream processes. For example, determination of raises, applying strikes to a record, identification of candidates needing coaching, documentation of causes for termination, and identification of employees meriting termination can be based on the actionable data.

A survey may be provided (e.g., automatically) to employees (e.g., as a unique link to a web application, etc.) and provide a data intake for generating actionable data analytics. The survey can be conducted on either mobile or desktop devices. The data analytics may be as granular as a single employee or as aggregated as an entirety of the organization (e.g., company-wide), as well as by department, workgroup, team, etc. For example, if a company is divided into a sales division and an engineering division, and the engineering division is further divided into backend team and frontend team, then the analysis may be performed for the whole company, the sales division, the overall engineering division, the backend team of the engineering division, and/or the frontend team of the engineering division.

An authorized user, such as an employer or the like, can log in to a web application and choose survey parameters. Survey parameters may include, for example and without imputing limitation, a survey start date, reporting frequency, survey availability duration, individual employees to survey, employee groups (e.g., workgroup, team, division, department, etc.), etc.

The web application may generate an org chart based on a provided org chart (e.g., by the company) and employee photographs. The authorized user can then visually explore the generated org chart to, for example, check for errors, etc. In some examples, where the generated org chart does not include employees from a previous survey, the authorized user may be prompted to provide correction or explanation (e.g., documentation) such as whether the respective employee retired, was fired, quit, etc. The correction and/or explanation can then be used for further trend analysis.

Employees, either indicated by the survey parameters or across the entire company by default, may receive an email allowing each respective employee to directly log into the web application and begin the survey. Employees may be asked overall company satisfaction questions and can see a list of coworkers within the same department who they may rate. In some examples, the employee may add additional coworkers to rate. As an employee adds additional coworkers, that same employee may be added to a list provided to each additional coworker. In some examples, the list can include the employee who rated the additional coworkers. In some examples, this list may obfuscate which employees rated which other employees by adding a random subset or an entire group or department to a list to be rated by a coworker based on the employee adding them.

A survey may be visible to different groups of users depending on its state. For example, the survey may be in "Pending" state after it has been configured and scheduled by an administrator, but is not yet open for responses. In the Pending state, the survey may be only visible to administrators. Once the administrator opens the survey, either by manually triggering it to be opened or by setting a timer for when the survey should open, the survey enters an "Open" state. In the Open state, all users may access and update their responses to the survey. Once a user completes a survey, the survey may enter an "Admin Review" state, and the responses may be sent to an administrator for review. If the administrator completes the review process and deems the survey valid, the survey then enters a "Closed" state and becomes available for all users to view. If the administrator considers the survey results invalid, the administrator may delete the survey, and the survey enters a "Deleted" state such that only certain administrators (e.g., "super" administrators, etc.) may view the surveys. In some examples, a survey that has been in the Closed state for a predetermined amount of time may be automatically changed to be in the Deleted state.

Generally, the survey may visually indicate that, on average, employees should rate coworkers an average score. For example, where the survey provides a ranking of 1-5, the average may be a three and the three may be located centrally along a sequence and/or be highlighted by distinctive selection size, font format, coloration, etc. Or, in other words, the survey may visually indicate that a surveyed employee should on average rate coworkers targeting an average of three. Additionally, the survey can include for each rated coworker a list of selectable attributes that are descriptive of that coworker such as, for example and without imputing limitation, "angry", "indecisive", "friendly", "creative", "uncooperative", "inflexible", "communicator", "reliable", "vindictive", "apathetic", "enthusiastic" "hard-working", "rude", "disorganized", "intelligent", and "team-oriented".

In some examples, the coworker ratings are based on how much an employee (responding to the survey) likes working with the respective coworker. The rating will typically be a combination of the friendliness of the coworker, willingness to help, and ability to accomplish work (i.e., as perceived by the employee). However, each employee may determine their own respective most important factors for each coworker to generate data indicating which employees are most effective at raising company satisfaction levels overall.

Additionally, employees, such as supervisors or managers, can view a full org chart during and after the survey via the web application. As a result, employees may visualize and interactively explore the company structure. While the survey is active, the employee can select coworkers to rate directly from the org chart. Further, as the survey progresses across all selected employees, authorized users may view how many have completed the survey (e.g., as a ratio, percentage complete, total surveys completed, etc.). In some examples, the generated org chart can be viewed by the authorized user and a percent of employees under each manager who have completed the survey can be viewed so that, for example, managers can be prompted to remind their employees to complete the survey.

The web application may include automated email processes associated with the survey. For example, while a survey is active for an employee, regular reminder emails may be sent to the employee prompting completion of the survey. Additionally, the employee may be sent an email soliciting a rating of additional coworkers identified by the system as candidate coworkers the employee may want to rate. Various video tutorials and reminders (e.g., explaining anonymity, surveying process, results, interface, etc.) may be integrated directly into the web application.

Additionally, the web application may allow manual identification of employee's interactions with customers, or use existing sales data to automatically identify these relationships. The web application will then message the customers prompting them to complete a survey to provide feedback on the interactions. Results from these customer surveys may then be collected and incorporated into the feedback and rating system corresponding to each employee. Customer surveys may be sent immediately after a transaction (i.e. for a retail purchase or a technical support interaction) or on a periodic bases (i.e. monthly monitoring of a business service provider to their clients).

Once the survey is complete, either due to all (e.g., a quorum) surveyed employees completing the survey or as a result of the survey duration completing, actionable data analytics can be provided to, for example, senior leadership and HR. To protect privacy, data may be displayed only where a respective sample size is five or more (e.g., n>=5). For example, if an employee has been rated by only a single coworker, data regarding that employee may be withheld from being viewable. However, where an employee has been rated by five or more coworkers, a respective average rating and clustering of attributes selected for that employee may be provided to HR. In some examples, the sample size threshold may be different based on the type of data. For example, employee attribute data may have a threshold of 15 or more individual coworker ratings. Company-wide attributes and free comments may have a threshold of 100 or more individual employee ratings (or company size, etc.).

The actionable data analytics can include a score for each employee based on an aggregation of ratings that employee received through the survey. As part of the aggregation process, the ratings can be weighted, for example, based on the employee that provided them.

For example, every score may be initialized to a predetermined average (e.g., provided by the authorized user, etc.). For example, the predetermined average may be 8.0. Each rating to be aggregated into the score can be converted into a value of −1.0, −0.4, 0, +0.8, or +2.0 to result in a final score between 7.0 and 10.0 for each employee. The converted ratings may then be summed, and a weight may be applied to the summation based on the number of response. For example, and without imputing limitation, the table below may describe a weighting scheme based on n number of responses received.

TABLE 1

| Responses | Score Weight |
| --- | --- |
| n = [1, 5] | 0.3× |
| n = [6, 10] | 0.5× |
| n = [11, 20] | 0.7× |
| n = [21, 30] | 0.8× |
| n = [31, 50] | 0.9× |
| n > 50 | 1× |

Further, where 50 or more coworkers all rate an employee, a minimum score may be given to the employee (e.g., a converted value of −1.0). However, where 50 or more coworkers all rate an employee, a maximum score can be given to the employee (e.g., a converted value of +2.0).

Once ratings have been determined, employees receiving a maximum rating (e.g., a rating of 10.0), may be associated with an increased weight (e.g., a factor of 1×) for rating given by that employee to coworkers. In comparison, employees receiving a minimum rating (e.g., a rating of 7.0) may have their outgoing ratings reductively weighted (e.g., a factor of 0.25×). Employees between maximum and minimum ratings may likewise receive weightings along a corresponding sliding scale. To account for increased influence of employees substantially more well-received within the company than average (and, likewise, account for decreased influence of employees substantially less well received within the company than average), outgoing ratings for each employee can be recalculated based on the weighted values.

Other scores reflective of overall workforce trends can also be calculated. For example, a happiness score can be calculated based on a scale ranging from a "100%" indicating approximately 100% of employees rating the company "5" on the survey to a "0%" indicating approximately 100% of employees rating the company a "1". Employee engagement can be calculated based on a percentage of users who responded to the survey and/or rated the company a "4" or above. In some examples, company comparisons can be conducted by the web application to provide insight as to, for example and without imputing limitation, engagement and happiness scores of the company in comparison to other companies of comparable location, industry, size, etc. Further, the survey may include plain text fields for employees to provide additional comments and the like. The plain text results may be summarized with a list of comments and/or word cloud, which may limit the word/comment display to groups of more than 50 employee surveys to preserve anonymity, etc.

Survey results and actionable data analytics, such as the score and/or individual ratings, can be provided to varying degree to defined groups within a company. For example, each employee can see anonymized ratings and/or rating(s) over time as well as what attributes other employees have assigned to them. Employees may also see ratings received from different coworker groupings such as, for example and without imputing limitation, coworkers above the employee (e.g., managers), coworkers below the employee (e.g., coworkers who report to the employee), inside coworkers (e.g., coworkers within the same department as the employee), and outside coworkers (e.g., coworkers in different departments than the employee), sometimes referred to as ABIO scores.

The ABIO scores can be used to automatically identify employee types and the like. Generally, the employee types refer to a grouping of employees by behavior such as personality, workstyle, performance, and/or other factors that may be useful for appraising an employee. For example, an employee who has an "Above" rating averaging to 8.0 and "Below" and "Outside" ratings each respectively averaging out to 8.7 or higher may be automatically labeled as a "Silent Superstar" because the extent of the employee contributions may not be fully known by those above them.

In some examples, an employee, such as a supervisor for example, can also see the ratings of coworkers who report to that respective employee (e.g., members of a team for which the supervising employee is responsible, etc.). Ratings for other coworkers (e.g., lateral supervisors or managers hierarchically above the supervisor, etc.) may be hidden from the employee. As a result, only a company chief executive officer (CEO) or equivalent may be able to view the ratings of every employee within the company.

The employee may view ratings of coworkers via the navigable org chart or by a list interface. The employee can automatically filter by employee type when viewing coworker ratings. For example, a manager may filter by "Silent Superstar" to identify which employees are promising and which supervisors may need additional coaching. In another example, an employee may filter according to overall high ratings or overall low ratings and the like. Additionally, an employee (e.g., a manager, etc.) can view a percentage indicating how many coworkers below them has completed the survey.

Further, based on the survey results and actionable data analytics, data can be aggregated to automatically generate reports for particular employee groups. In some examples, a rating can be generated for an entire department, which can be treated substantially similarly to an individual employee (e.g., with ratings given by department members and ratings received by individual department members and/or the department as a whole). Further, scaling factors (as discussed above) can be applied or reapplied to the abstracted department and/or individual.

For example, department heads, HR, and administrators may receive a report including aggregated ratings indicating how each department likes working with employees of other departments, internal employee satisfaction levels as either a raw value or relative to other departments, perception indicator of a selected department from other departments either raw or relative to other departments, engagement level and completion rate of employees for each department, which employees work well with each department (e.g., a VP of an engineering department is rated very highly by more than 50 people in a purchasing department, etc.), which employees work poorly with each department (e.g., a VP of a research and development department is rated poorly by more than 20 people in an accounting department, etc.). Aggregating individual data into larger groups enables corporate issues to be identified and addressed for department-wide cooperation levels.

In some examples, certain reports or report components may only be available to, for example, the CEO and/or designated HR representatives. For example, the certain reports or report components may include, without imputing limitation, a graph of average employee score, average number of responses, and/or average happiness as a function of salary (e.g., in order to understand efficacy of the company at paying the most liked employees higher salaries, etc.), an average overall company ratings for all employees, and ratings related to employees who have been fired, laid off, or have resigned (e.g., ratings of their managers, etc.).

These and other features, and characteristics of the present technology, as well as the methods of operation and functions of the related elements of structure, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

FIG. 1 is an example system 100 for generating actionable data analytics from an automated survey. System 100 may include one or more servers 102 having an electronic storage 122 such as a database or other memory system and one or more processors 124 for performing machine-readable instruction 106 to generate the actionable data analytics.

Machine-readable instructions 106 can include a variety of components for performing specific actions or processes in performing automated surveys, managing the surveys, storing and processing data produced by the surveys, and various other functions as may be apparent to a person having ordinary skill in the art. A survey management component 108 can perform, manage, and prepare a survey for users to respond to via client computing platforms 104. Client computing platforms may receive and/or generate a user interface (UI) 105 for various operations such as creating a survey, reviewing survey results, responding to a survey, etc.

A report generation component 110 may access survey results from survey management 108 or from electronic storage 122 in order to generate reports which may be reviewed by users via client computing platforms 104 or provided to external resources 120 (e.g., such as downstream APIs and the like). The external resources 120 may use the survey results, for example and without imputing limitation, to determine a probability that an employee would perform well if promoted, or determine if an employee is at high risk for disciplinary action. An org chart management component 112 receives org charts from users and produces navigable org charts associated with data from survey management 108, report generation 110, or electronic storage 122. Further, org chart management 112 can update produced org charts according to survey management 108 operations by, for example and without imputing limitation, proposing optimizations to the org chart to improve team structure, or identifying new employees (e.g., new hires) or employees that are no longer surveyed (e.g., employee terminations/resignations). A scheduling service 114 may receive scheduling instructions from client computing platforms 104 or external resources 120 and may enforce received schedules such as performing a survey at regular time intervals or at specified times. An email service 116 can perform email operations supporting the other components such as sending out survey notices, survey links, generated reports, org charts, and the like.

Figure 2:
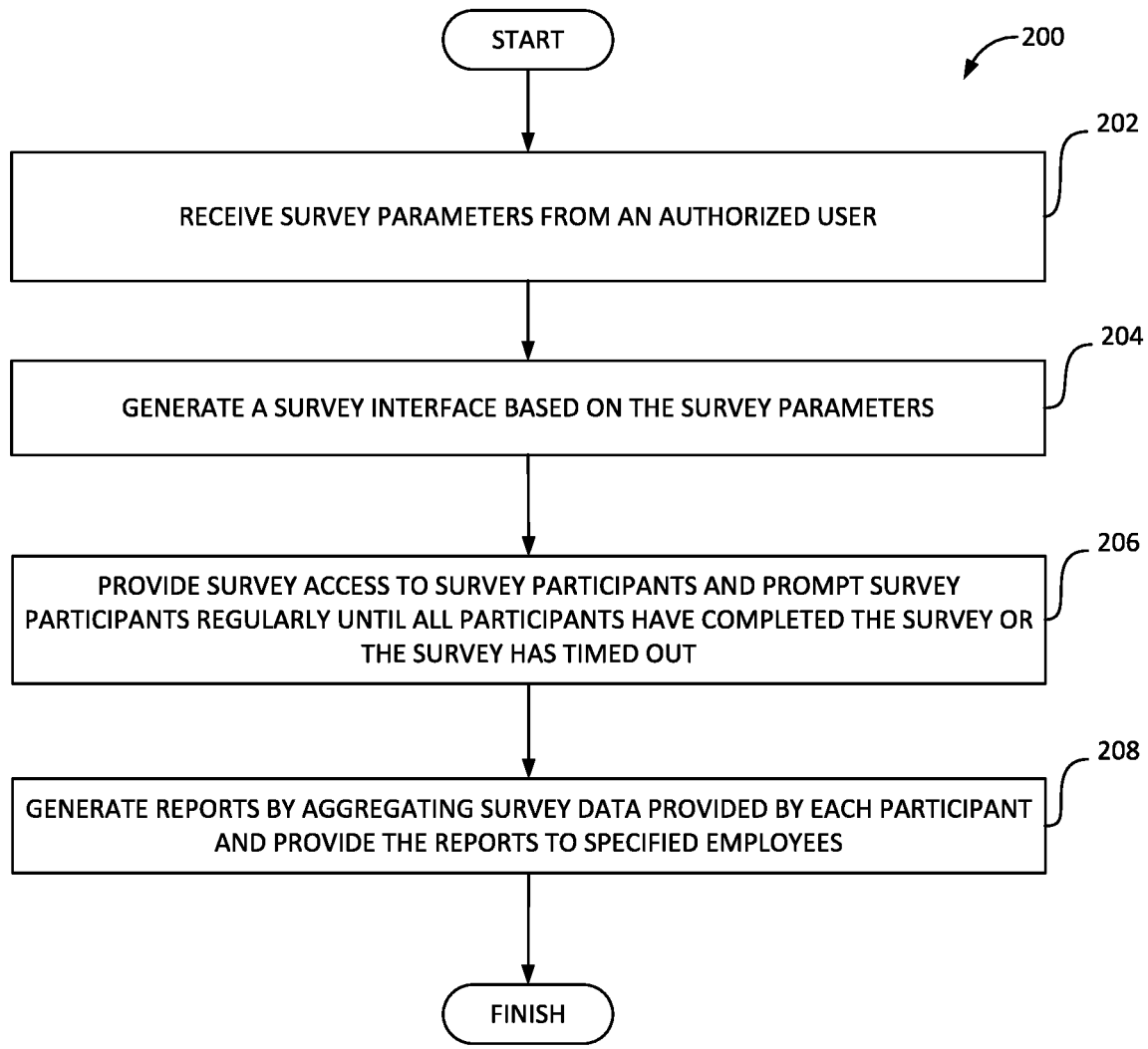
FIG. 2 illustrates a flowchart for a method for generating reports, according to embodiments of the present technology.

FIG. 2 is an example method 200 for generating reports based on and including actionable data analytics. Method 200 may be performed by system 100 to generate reports and the like.

At operation 202, survey parameters are received from an authorized user. Survey parameters may include designation of survey participants such as specific employees, departments, managers and/or those beneath designated managers, etc. Survey parameters may also include timing or scheduling information (e.g., to be processed by scheduling service 114) for performing a survey at specified times or a specified schedule. In some examples, survey parameters can include specified survey questions or formats.

At operation 204, a survey interface is generated based on the received parameters. The survey interface may be multiple pages long and structured for scaling to computer, mobile, smartphone, and other device constraints.

At operation 206, participants (e.g., designated in the survey parameters) are provided access to the survey and can be prompted (e.g., regularly, semi-regularly, scheduled, etc.) to complete the survey until the survey times out (e.g., expires according to a timing parameter provided as a survey parameter). Participants may receive access to the survey via an email, link, text message, etc. provided by, for example, email service 116. For example, a link to the survey may be emailed to each recipient and, when clicked, the link can direct the recipient to a web application accessible via mobile, desktop, smartphone, and various other devices.

At operation 208, the survey data provided by each participant is aggregated and processed into a report and provided to specified employees (e.g., specified by the survey parameters). The generated report may be provided via email (e.g., by email service 116) and can include direct survey responses as well as generated data based on the survey responses such as, for example and without imputing limitation, happiness/satisfaction scores across the whole company, cohesion information, interdepartmental communications guidance, etc.

Figure 3:
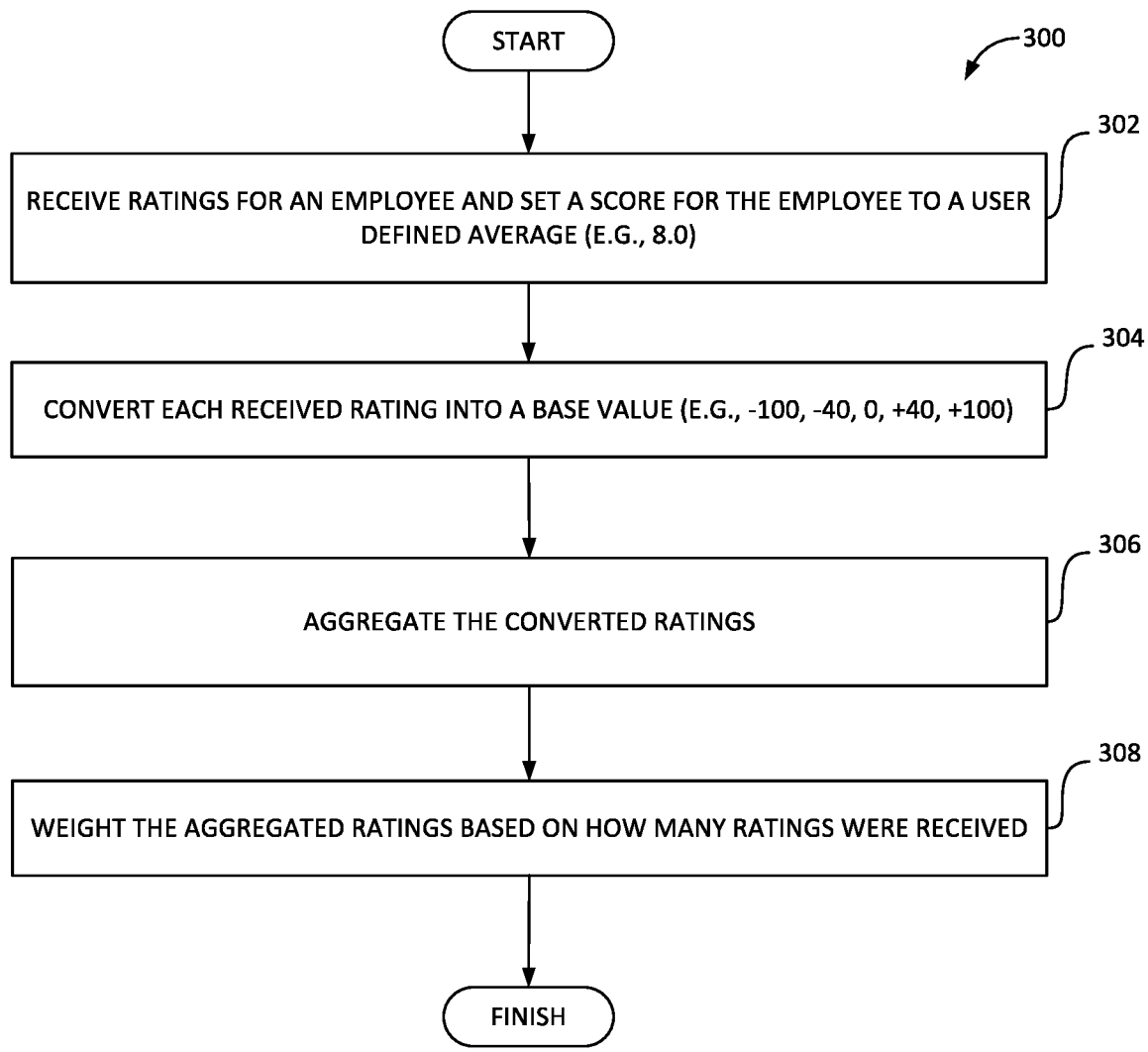
FIG. 3 illustrates a flowchart for a method for generating aggregated ratings for employees, according to embodiments of the present technology.

FIG. 3 is an example method 300 for processing survey response data. In some examples, method 300 can be performed by survey component 108 and the adjust scores can be used by report generation 110.

At operation 302, ratings are received for an employee (e.g., via survey) and a score can be set for the employee to a user defined average. The user defined average may be provided by an authorized user via survey parameters during survey creation (e.g., as discussed above in reference to FIG. 2).

At operation 304, each received rating for the employee is converted into a base value (e.g., −1.0, −0.4, 0, +0.8, +2.0 from a five star system). The converted values base values can be used to more efficiently aggregate or otherwise process the ratings. For example, the converted values may make aggregation methodologies involving summation easier by placing values along a 0-100 and positive to negative scale.

At operation 306, the converted ratings are aggregated. In some examples, aggregation can be accomplished via summation. In some examples, aggregation can be performed according to certain algorithms or averaging (e.g., mean, median, mode, etc.). At operation 308, the aggregated ratings are weighted (e.g., a multiplier is applied) based on how many ratings were received.

Figure 4:
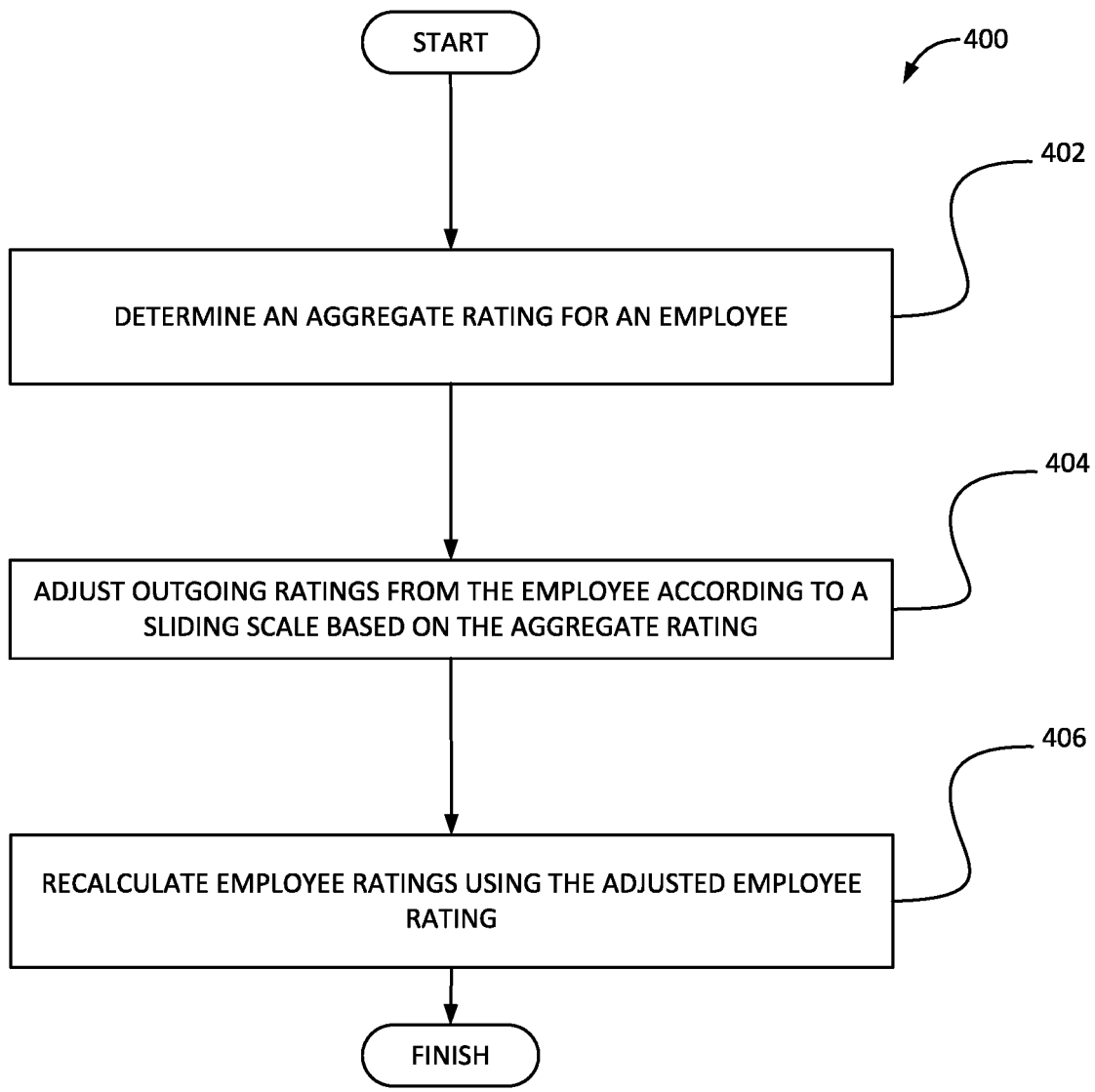
FIG. 4 illustrates a flowchart for a method for adjusting employee ratings, according to embodiments of the present technology.

FIG. 4 is a method 400 for processing ratings for an employee based on weighting considerations. For example, method 400 may be performed in order to take into account company size and/or for varying influence among employees.

At operation 402, an aggregated rating is determined for an employee (e.g., via method 300 discussed above). The aggregated rating is determined based on surveyed coworkers of the employee and response rate.

At operation 404, ratings (e.g., of other employees, or coworkers) made by the employee are adjusted according to a sliding scale based on the respective aggregated rating for said employee. For example, ratings made by an employee with a universally high rating may be weighted to count for double when performing a respective aggregation process. In comparison, ratings made by an employee with a universally minimal rating may be weighted to count for quarter as normal (e.g., weighted by 0.25) when performing a respective aggregation process. Once adjustments have been made for every employee, at operation 406, each adjusted employee ratings may be used to recalculate the employee ratings. As a result, employee influence may be accounted for when performing aggregation of the survey data.

Figure 5:
FIG. 5 illustrates an example survey, according to embodiments of the present technology.

FIG. 5 is an example survey 500. Survey 500 can be performed by a computer, mobile device, and/or smartphone. Survey 500 enables a responder to provide satisfaction information related to a job, management, leadership, compensation, workspace, and the like. Additionally, free comments can be provided. Survey participants can also rate coworkers based on a 1-5 rating of satisfaction working with the respective coworker as well as selection of words from a descriptive word bank.

FIG. 6 is an example user page 600 that can provide a user (e.g., an authorized user), who may also be an employee, access to the systems and methods of this disclosure. User page 600 can include a home page, org chart page, reports page, and configuration page. The home page provides an overview of past, current, and planned surveys and includes links to response rate, results summary, detailed org charts, tabular formatted data, and salary reports. Current surveys can be displayed with percentage completed so far. Additionally, planned surveys may include links to survey settings (e.g., to provide or update survey parameters) as well as options to use a current org chart or update the org chart.

FIG. 7A is an example department report interface 700 that can provide a user (e.g., a manager, senior employee, etc.), a view of ratings which have been aggregated and abstracted to a particular department (e.g., marketing, etc.) as a whole. Department report interface 700 can include an inter-department ratings section 710 and a department information section 720.

Inter-department ratings section 710 may include a tabular listing of ratings between other departments and the particular department. Further, a company-wide average rating, both rating the particular department and as rated by the particular department, may be included at the top of the tabular listing. In some examples, inter-department ratings sections can provide a time-comparison view. Here, for example, inter-department ratings section 710 includes ratings for two different years (e.g., to appraise progress, etc.). In effect, inter-department ratings section 710 enables a user to quickly view how other departments, overall, interact with a particular department and so identify which departments collaborate better or worse with each other.

Department information section 720 may include various department information to, for example, contextualize inter-department ratings section 710 and the like. Depart information section 720 may include a tabular view. In some examples, department information section 720 includes, for example and without imputing limitation, department size, engagement, happiness, completion (e.g., survey completion, etc.), and average inter-department rating. Additionally, department information section 720 may include information for multiple time periods (e.g., years, quarters, etc.) as well as an indication of a change in information, or delta, between the time periods.

Figure 7B:
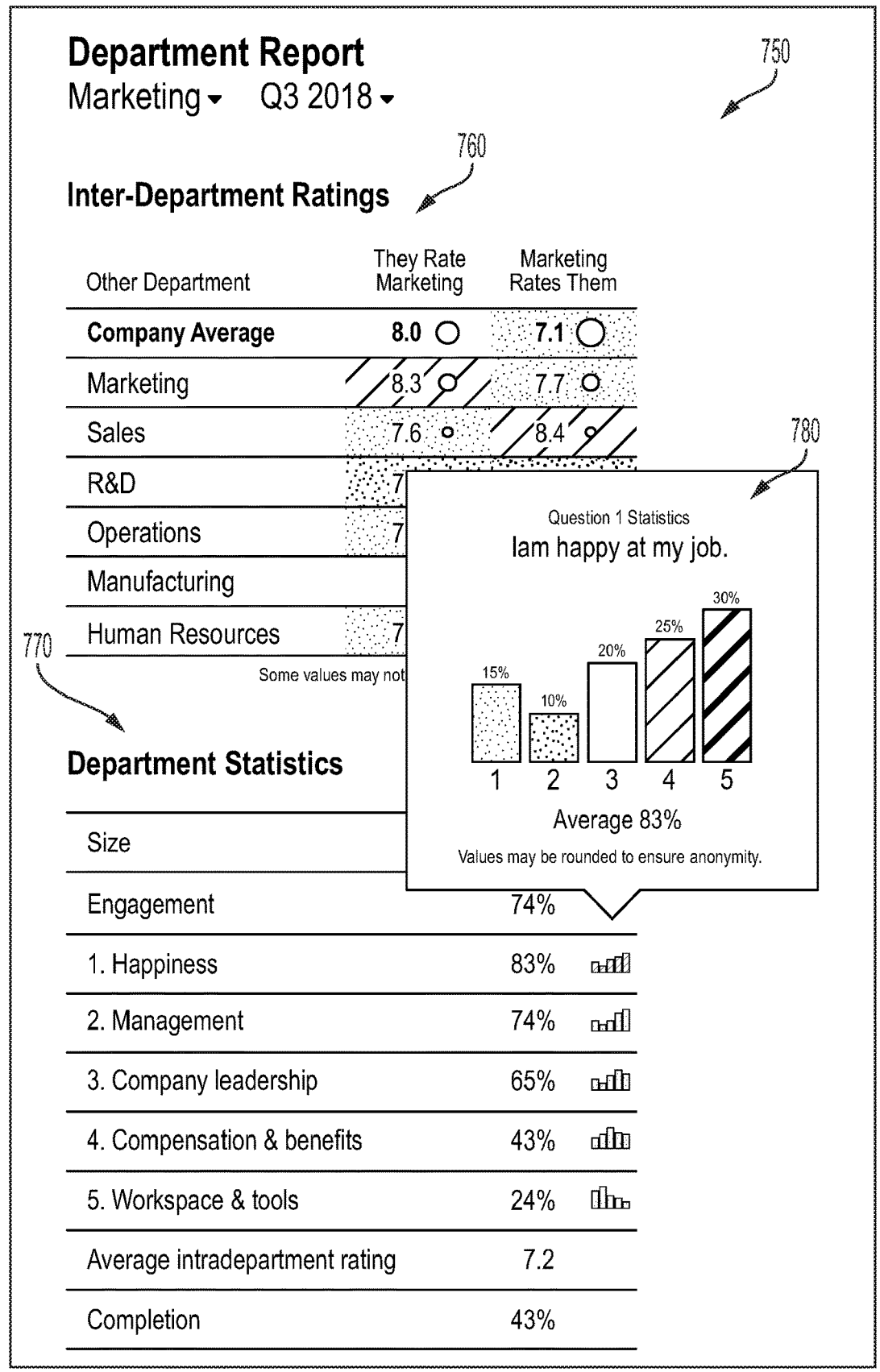

FIG. 7B is an example department report interface 750 that includes data visualizations for intuitive and fast review of department-specific information generated via surveys (e.g., as discussed above). Inter-departments ratings section 760 includes further visual elements (e.g., in comparison to department report interface 700) to indicate response strength and the like through, for example, a circle icon that is sized according to a relationship between the particular department and the department listed for comparison. Further, department information section 770 includes a chart icon indicating that detailed information is available for a particular department statistic (e.g., happiness, management, company leadership, compensation and benefits, workspace and tools, etc.). In some examples, the chart icon may be interacted with to view an expanded graph view 780 which includes a bar chart depicting a spread of responses related to a respective department statistic.

Figure 8:
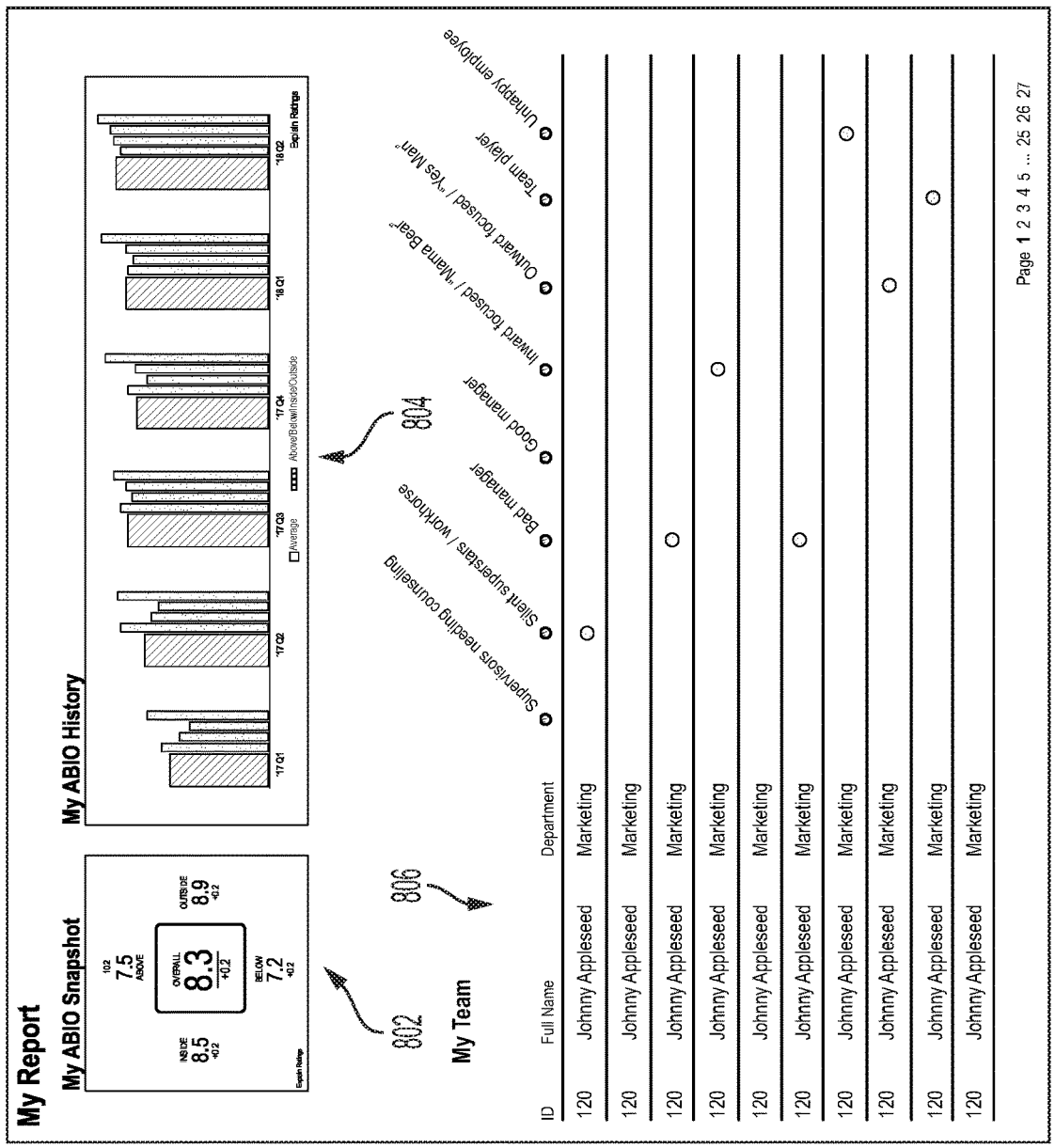
FIG. 8 illustrates an example reporting interface for an individual and team, according to embodiments of the present technology.

FIG. 8 is an example reporting interface 800 for a user to review their own ABIO score history as well as an ABIO composition of a respective team. For example, reporting interface 800 includes an ABIO snapshot 802 providing the user recent ratings information and a resultant ABIO score. An ABIO history 804 provides comparison snapshots of the user ABIO score over multiple time periods. Each comparison snapshot is displayed as a bar chart of each sub-score that makes up the ABIO score for the respective time period. As a result, a user can see changes to the user ABIO score as well as quickly appraise along which dimensions (e.g., above, below, inside, outside, etc.) changes have taken place. Further, a team composition section 806 shows the user which employee types are present on a respective team and how many. The employee types are based on respective ABIO scores for team members, which may be kept unknown to the user in order to maintain anonymity of the data.

FIG. 9 is an example team ABIO report interface 900 for reviewing ABIO information across an entire team for each member of the team. An authorized user (e.g., a team lead, manager, supervisor, etc.) can access team ABIO report interface 900 to review ABIO scores for all members of the team. Team ABIO report interface 900 can include a tabular view 902 in which each row is associated with a particular employee (e.g., team member) and columns provide identification 904, name 906, department 908, an overall ABIO value 910, and individual ABIO component values 912-918.

More particularly, overall ABIO score 910 and individual ABIO components values 912-918 are further broken down to respective scores and sample size used to determine said scores. Overall ABIO value 910 includes an overall ABIO score 910A and respective overall ABIO sample size 910B, Above component value 912 includes an Above score 912A and respective Above sample size 912B, Below component value 914 includes an Below score 914A and respective Below sample size 914B, Inside component value 916 includes an Inside score 916A and respective Inside sample size 916B, and Outside component value 918 includes an Outside score 918A and respective Outside sample size 918B. As can be seen with Below score 914A, where a sample size is insufficient to calculate a rating for an employee (as discussed above), an associated value may be labeled as "insig" or the like to identify that value as uncalculated at the time due to sample size limitations.

Figure 10:
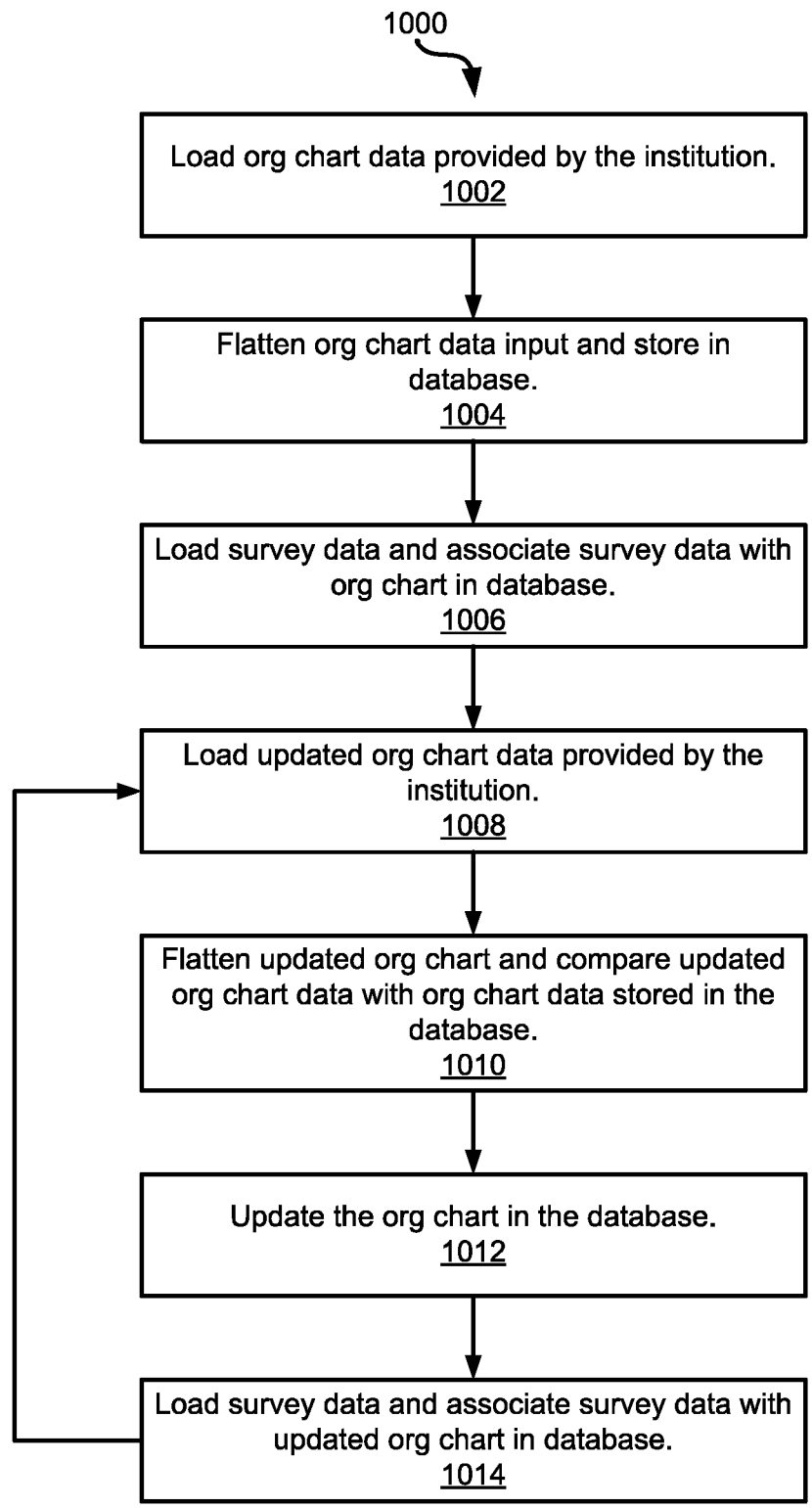
FIG. 10 illustrates a flowchart for a method for associating survey data with organizational chart information, according to embodiments of the present technology.

FIG. 10 is an example method 1000 that may be used to load and update org chart data to be used in the systems and methods discussed herein. In step 1002, the org chart data provided by the institution may be loaded. In some examples, the org chart data is provided by the institution in a tree type data structure.

In step 1004, the org chart data input is flattened and stored in the database. In step 1006, survey data is loaded into the database and associated with the org chart data. For example, the survey data may include survey questions that are separated into different groups, where each group of questions is associated with a different level of the org chart or a different branch of the org chart.

Once the initial org chart is loaded, it could be updated in the database. To update the org chart, the institution may load an updated org chart in step 1008.

In step 1010, this updated org chart is flattened and compared to the org chart currently stored in the database. In step 1012, the org chart stored in the database is updated to match the updated org chart data.

In step 1014, survey data is loaded into the database and associated with the updated org chart. The survey data may be the same as the survey data loaded in step 1006, or it may be different. Steps 1008 to 1014 may be repeated for multiple updates.

Figure 11:
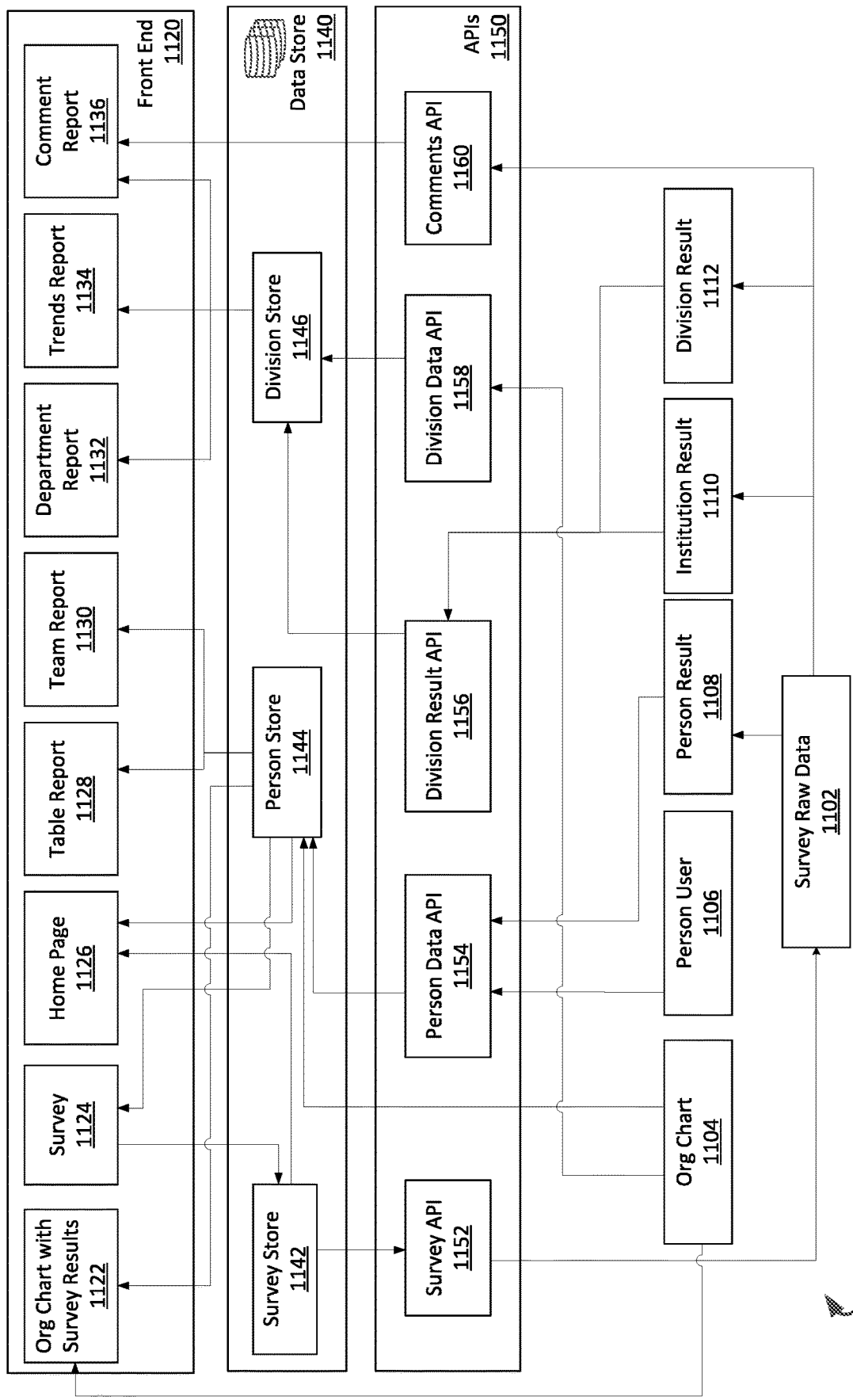
FIG. 11 illustrates an example system architecture, according to embodiments of the present technology.

FIG. 11 is an example system 1100. The example system 1100 comprises a front end 1120, a data store 1140, APIs 1150, and additional data like org chart 1104, person user 1106, and the survey raw data 1102.

The front end 1102 may be used to display data to users. The displayed data may include an org chart with associated survey results 1122, the survey 1124, a home page 1126, a table report 1128, a team report 1130, a department report 1134, and a comment report 1136. The front end 1120 may also be used to receive data input from the user. For example, the user may input responses to the survey 1124 through the front end 1120.

The system 1100 also includes a data store 1140. The data store 1140 may use a cloud storage system, a storage device, or multiple storage devices. The data store 1140 includes a survey store 1142 which stores survey data to be displayed on the front end 1120, a person store 1144 that stores user information and org chart data, and a division store 1146 that stores data related to a division of a respective institution. The system 1100 includes several different APIs. For example, survey API 1152, person data endpoint 1154, division result API 1156, division data 1158, and comments API 1160. The APIs provide an interface for the various parts of the system 1100 to communicate with each other. For example, once a user inputs survey 1124 results through the front end 1120, the results are stored in survey store 1142.

Data from the survey store 1142 can be written into a database as survey raw data 1102 through the survey API 1152. The APIs 1150 may also be used to retrieve data to be displayed on the front end. For example, the person data API 1154 may be used to store user information 1106 and person survey result 1108 in the person store 1144. The division result API 1156 may be used to store institution result 1110 and division 1112 in the division store 1146. The comments API 1160 may be used to display comments from the survey raw data 1102 to the comment report 1136 of the front end 1120.

Figure 12:
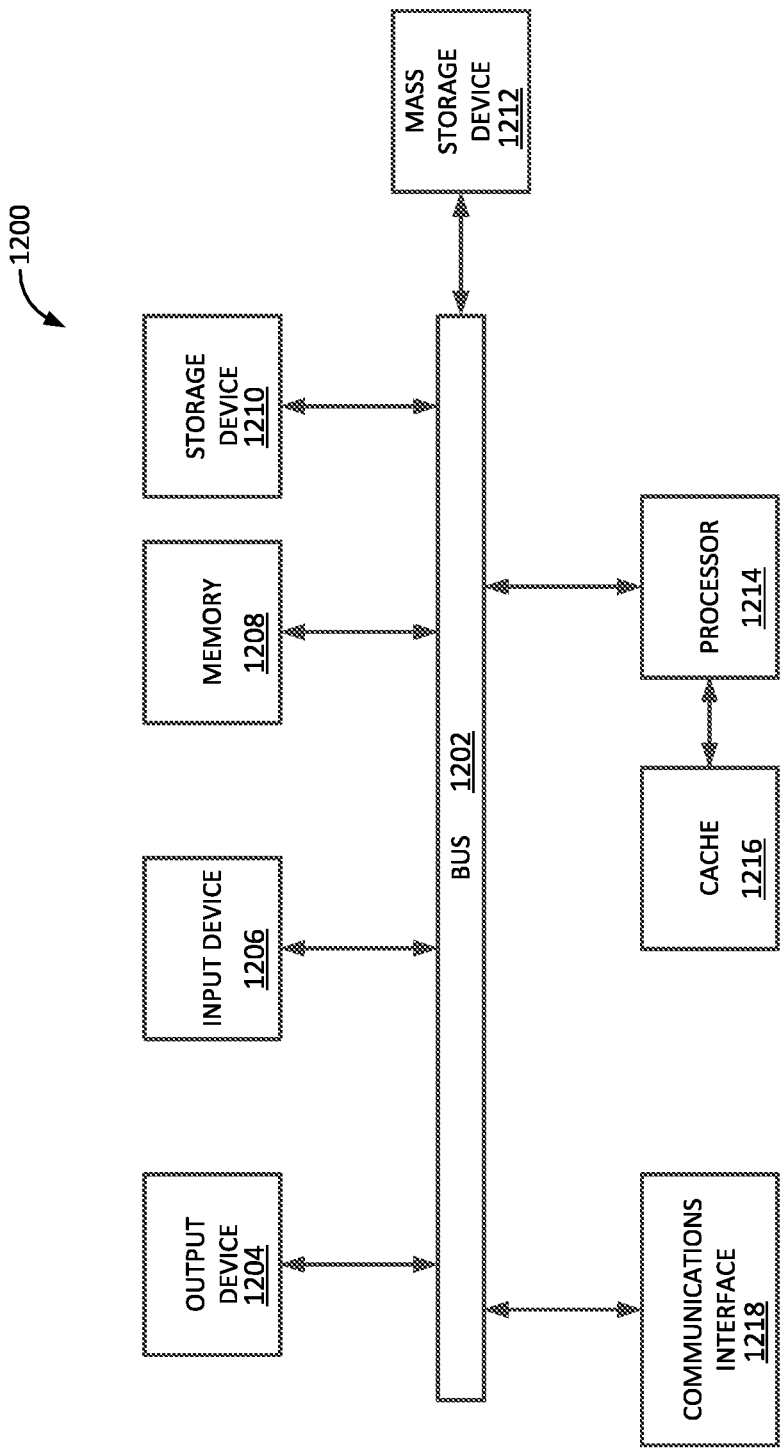
FIG. 12 illustrates an example computing system for performing methods of the present disclosure, according to embodiments of the present technology.

FIG. 12 is an example computing system 1200 that may implement various systems and methods discussed herein. The computer system 1200 includes one or more computing components in communication via a bus 1202. In one implementation, the computing system 1200 includes one or more processors 1214. The processor 1214 can include one or more internal levels of cache 1216 and a bus controller or bus interface unit to direct interaction with the bus 1202. The processor 1214 may specifically implement the various methods discussed herein. Main memory 1208 may include one or more memory cards and a control circuit (not depicted), or other forms of removable memory, and may store various software applications including computer executable instructions, that when run on the processor 1214, implement the methods and systems set out herein. Other forms of memory, such as a storage device 1210 and a mass storage device 1212, may also be included and accessible, by the processor (or processors) 1214 via the bus 1202. The storage device 1210 and mass storage device 1212 can each contain any or all of the methods and systems discussed herein.

The computer system 1200 can further include a communications interface 1218 by way of which the computer system 1200 can connect to networks and receive data useful in executing the methods and system set out herein as well as transmitting information to other devices. The computer system 1200 can also include an input device 1206 by which information is input. Input device 1206 can be a scanner, keyboard, and/or other input devices as will be apparent to a person of ordinary skill in the art. The computer system 1200 can also include an output device 1204 by which information can be output. Output device 1204 can be a monitor, printer, USB, and/or other output devices or ports as will be apparent to a person of ordinary skill in the art.

The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

The disclosure now turns to a customer facing embodiment utilizing aspects of the systems and methods discussed above. The customer facing embodiment engages customers (e.g., after having recently purchased an item from a store front, etc.) to elicit feedback regarding their experiences via a graphical user interface (GUI). The feedback may be aggregated, processed, and displayed, for example and without imputing limitation, for operation managers in a GUI respectively rendered for an operations manager or the like.

Businesses rely on customer feedback, customer experiences, brand experience, and product experience to increase sales per customer, reduce churn, guide product portfolio decisions, guide investments into better buildings vs more employees, etc. However, it is difficult to get feedback from customers, which is why there are secret shoppers, focus groups, etc. Giving out surveys where one rates happiness from 1-10 and an accompanying open comment box is the industry standard for gathering customer feedback, but few people take surveys, and even fewer write out thoughtful open comments that describe their whole experience.

The present technology changes feedback in a couple of key ways. First, it uses a 1-5 scale. Customers do not actually use all 10 numbers on the traditional scale. It also makes 3 the largest number size-wise, anchoring feedback to 3 and reserving higher numbers for better experience. Traditional star platforms treat "5 stars" as "most everything went well", and "4 stars" as "there was at least one problem".

Most importantly, the present technology adds clickable attribute tags, so that businesses can get actionable positive and negative feedback even if customers do not write open comments. These attributes make it easy to compare across locations (30% of Galleria customers clicked "Clean," but 90% of Mall of America customers clicked "Clean"), trend over time, and induce categories of feedback. Clicking attributes is fast and easy, unlike filling out open comments.

Customers want to give feedback. They want their voice to be heard, they want businesses to operate better and fix issues. But customers do not have patience for long or frustrating surveys. If you ask a series of 8 1-10 questions about attributes that the customer had little opinion about, the feedback experience becomes frustrating. However, if these are reduced to short words or phrases that customers can tap on their phone or click with their mouse, the feedback experience becomes faster, easier, and feels enormously more satisfying.

Selecting the proper attributes to show customers is critical to receiving appropriate feedback. This can be difficult, as there may be several dozen attributes that the business is interested in (cleanliness, ease of use, speed, crowdedness, helpfulness, etc.), but different customers may feel more strongly about different attributes. When sending out potentially millions of surveys, manual selection of a few attributes may not be the best method. This invention can randomize, record response rates, and dynamically adjust the attributes shown as a function of geography, customer demographics, or any combination thereof.

The present technology uses survey data received from customers to generate a report, whose data is displayed for consumption by an authorized user and shown in FIGS. 13-19. One aspect of generating the report involves using attributes used by customers, whether written in open comments or selected from a subset of attributes displayed on a survey, which can be dynamically altered based on frequency in customer survey responses and generated manually or via algorithms from machine learning or artificial intelligence. These attributes make it easier for customers to give feedback by simply clicking the relevant attribute, and also make analyzing a mass of customer data easier by extracting high-frequency low-dimensional signals. Attributes can further vary by geographies and demographics, allowing for more granularity in generating the report.

Figure 13:
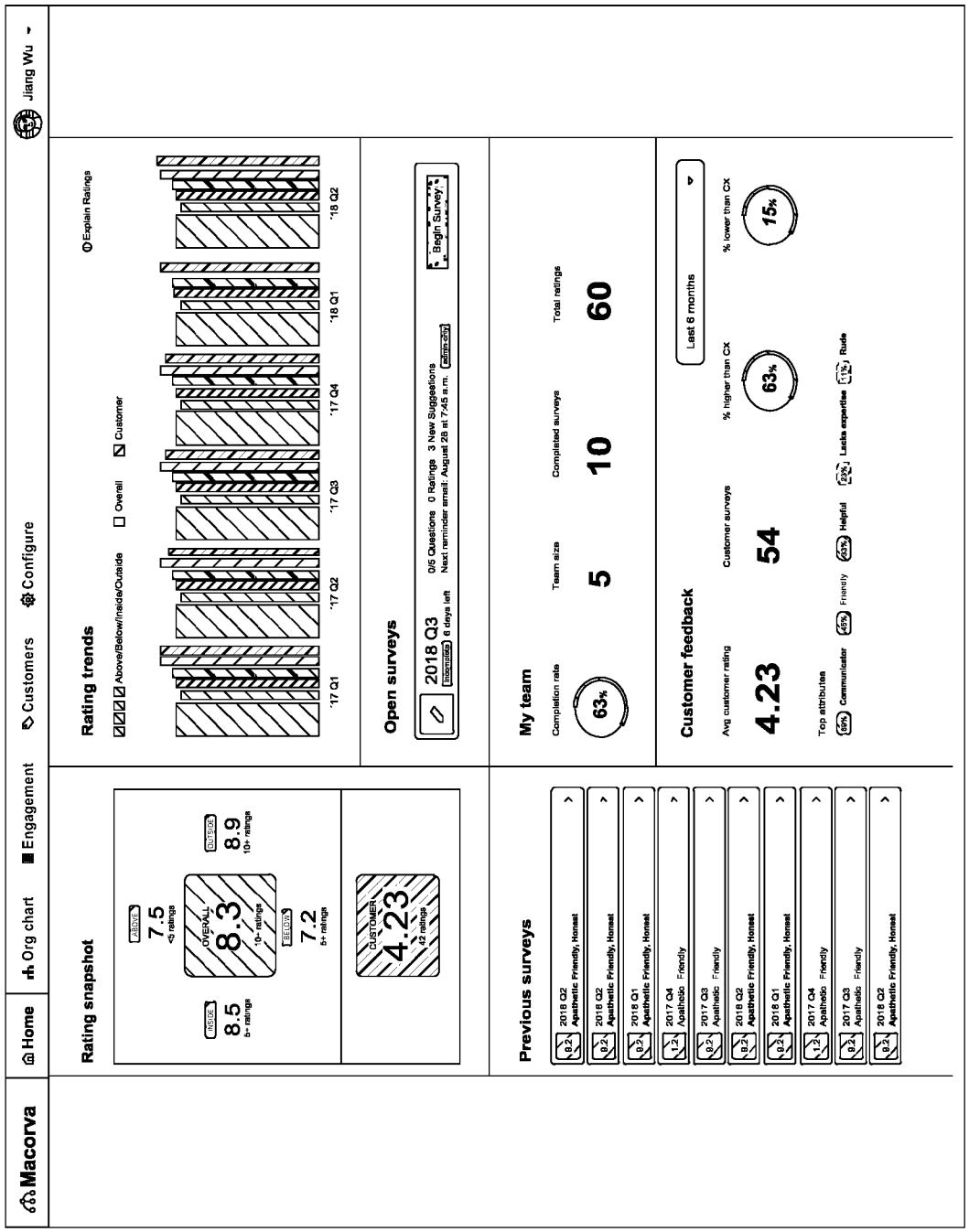

FIG. 13 shows a GUI 1300 for an authorized user, such as an operation manager, interested in customer experiences. The tabs at top display the current user (top right), as well as tabs for an organizational chart, customer engagement, customer information, configuration options, and a summary home tab. These tabs are interactable: they can be clicked and corresponding displays and ratings data received from customer responses to a survey or surveys will appear. Overall, GUI 1300 displays a report generated from data received from customer survey responses.

The "Home" tab (currently selected) can display information on customer ratings, surveys, and employees. "Rating snapshot" can display an aggregate rating by customers as well as more detailed information on employee ratings (above, below, outside, inside). Average customer rating can be the mean, median, or other average of customer ratings. "Rating trends" can show "Customer" as a bar, displaying average customer ratings by business quarter. In some embodiments, other time bins can be utilized. "Customer feedback" can display customer survey responses in more detail, including average customer rating, the number of customer surveys, percentages of reviews above and below average, and top attributes of employees. A drop-down menu can alter the time window whose information is displayed. "Previous surveys" can show a sampling of recently-completed surveys and high-level information, including the year and quarter, attributes, and overall rating. Individual surveys are interactable and can be clicked for more information. "My team" can display the number of employees on the workforce and the number of pursuant surveys.

Figure 14:
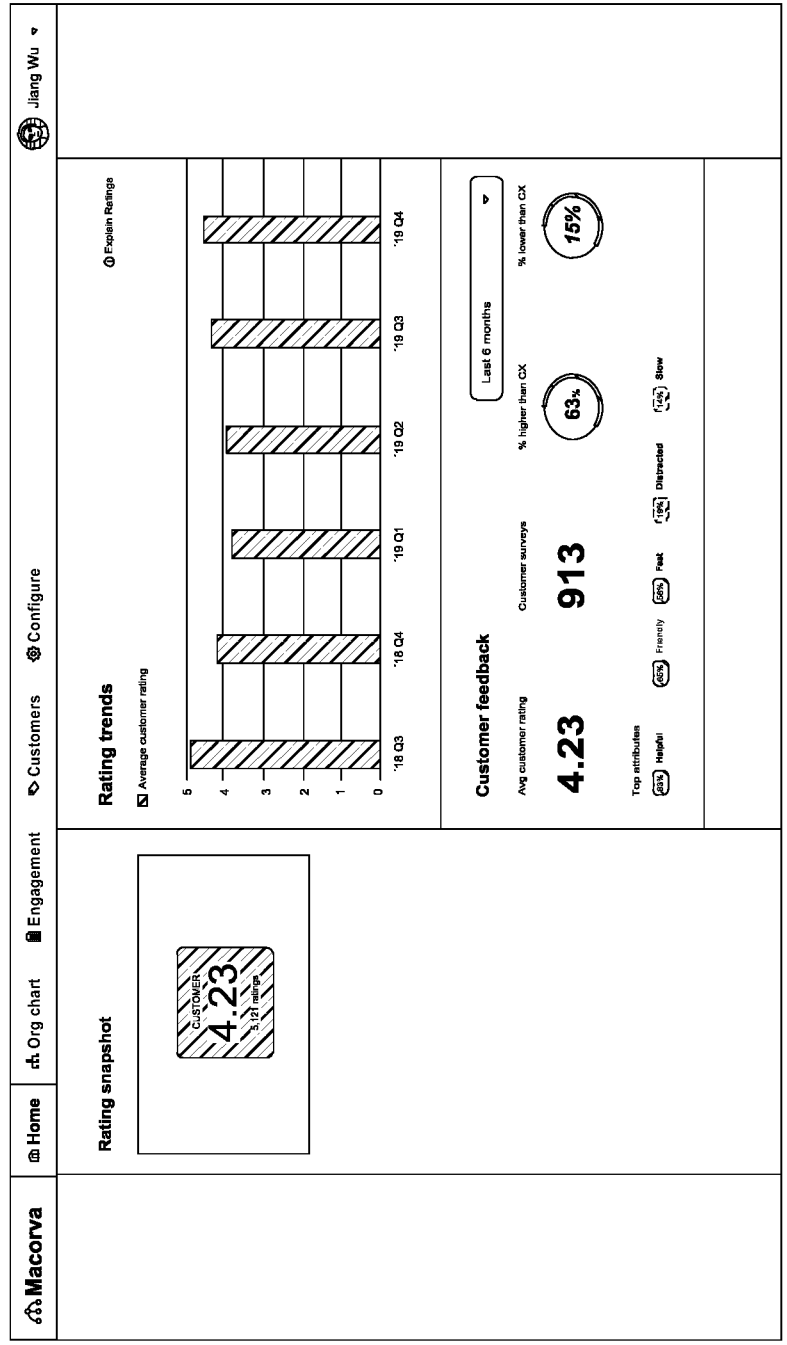

FIG. 14 shows an alternate GUI 1400 to the one illustrated in FIG. 13, displaying only customer-gleaned information. "Rating snapshot" can display the average customer rating. "Rating trends" can display the average customer rating over time, such as by fiscal quarter. "Customer feedback" can break down the average customer rating by adding top attributes, performance in comparison to others, and number of surveys received.

Figure 15:
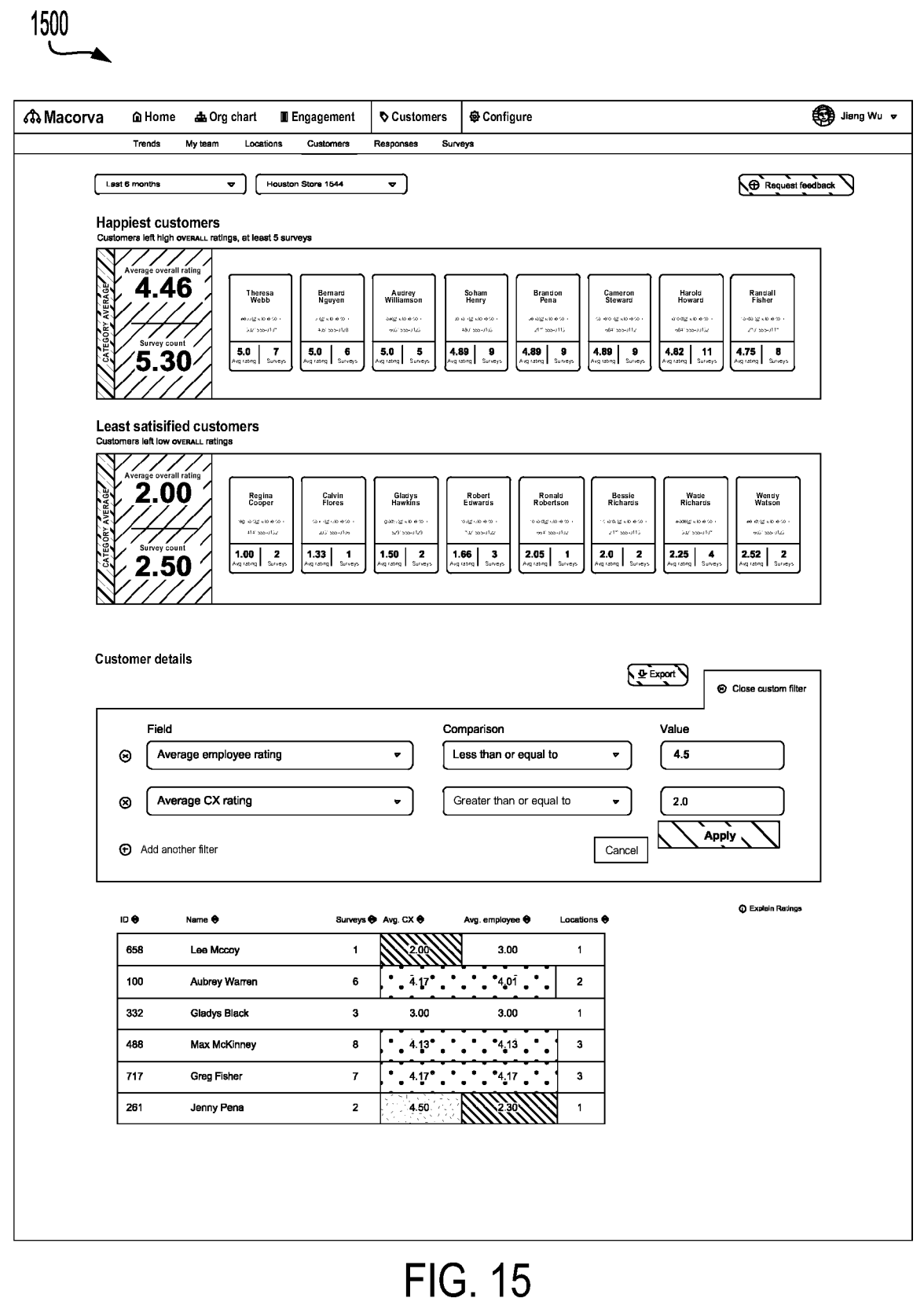

FIG. 15 shows a GUI 1500 for an operation manager when the "Customers" tab is selected. Under this highest-level tab there can be sub-tabs, labeled "Trends," "My team," "Locations," "Customers," "Responses," and "Surveys." GUI 1500 shows when the sub-tab "Customers" is selected.

At the top of GUI 1500, two drop-down menus can be available which allow a user to decide what customer information should be displayed. One can set a time window "Last 6 months" and the other can set a location "Houston Store 1544." Another button "Request feedback" can allow a user to request feedback from customers regarding their customer experiences.

"Happiest customers" can show customers who leave high ratings overall. In the category summary, averages can be shown for the average overall rating as well as the average survey count per customer. Individual customer data can be shown as well, displaying the customer name, contact information, average rating, and number of surveys. "Least satisfied customers" can display the same information, but for customers who leave low ratings overall.

"Customer details" can allow users to choose a subset of customer information to view. Users can choose filter fields from drop down menus, choose thresholds, and apply those to the underlying dataset to view all customers falling within the specified range. These results can be displayed as a table including customer ID, name, number of surveys answered, average customer experience, average employee rating, and number of locations visited. These results can be exported into a readable file format, such as a comma-separated value (CSV) file or Excel (XLS or XLSX) file.

Figure 16:
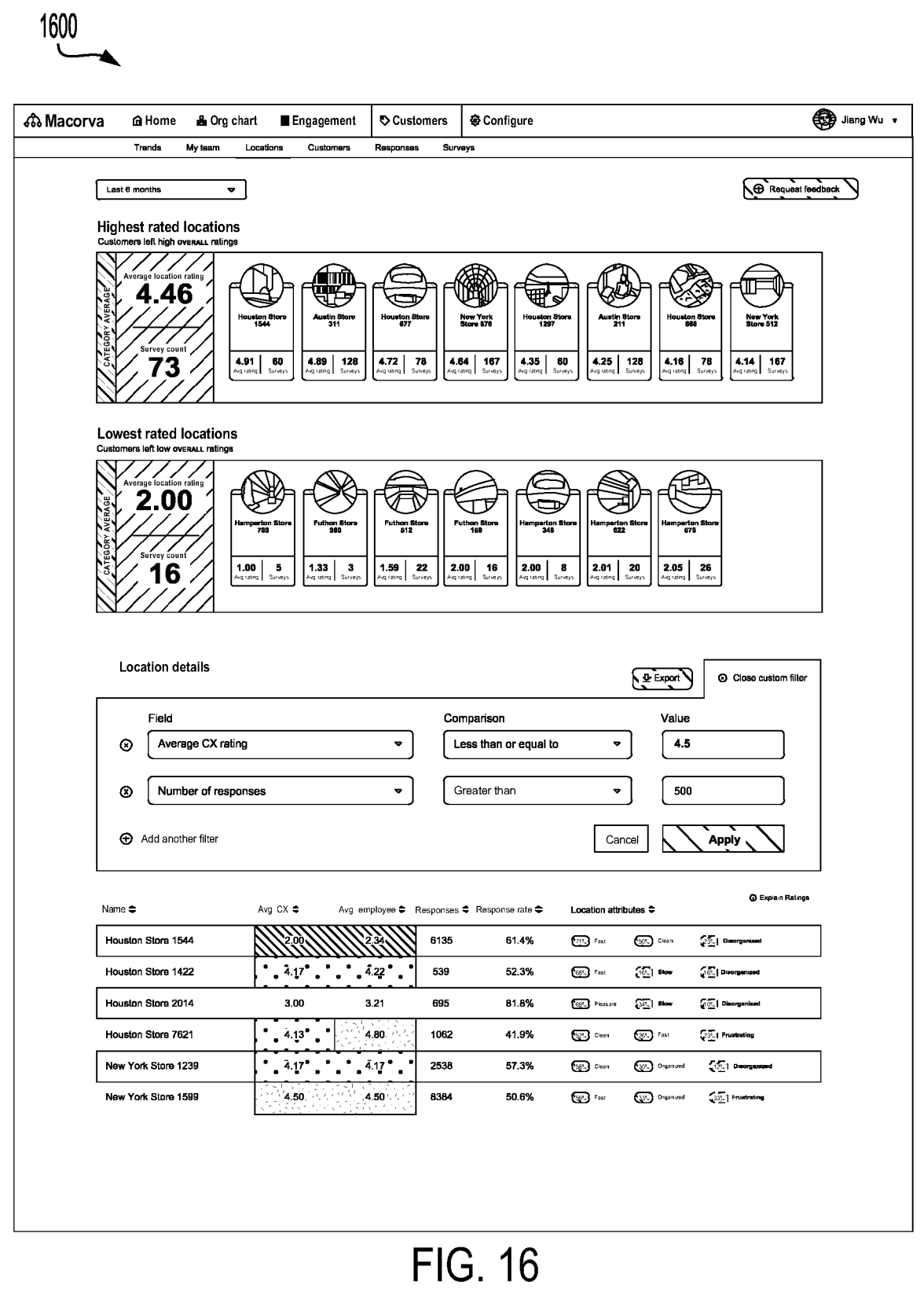

FIG. 16 shows a GUI 1600 for the "Locations" sub-tab under the "Customers" tab. The layout can parallel the presentation of "Customers" (shown in FIG. 15), with "Highest rated locations," "Lowest rated locations," and "Location details" paralleling information in "Happiest customers," "Least satisfied customers," and "Customer details," respectively. Information can be filtered by time (at the top) or by other fields (at the bottom). Data can be exported to a file for later consumption or analysis. Displayed categorizations of locations or branches can be different on different GUIs. In some embodiments, GUI 1600 can display projections of future performance for locations.

Figure 17:
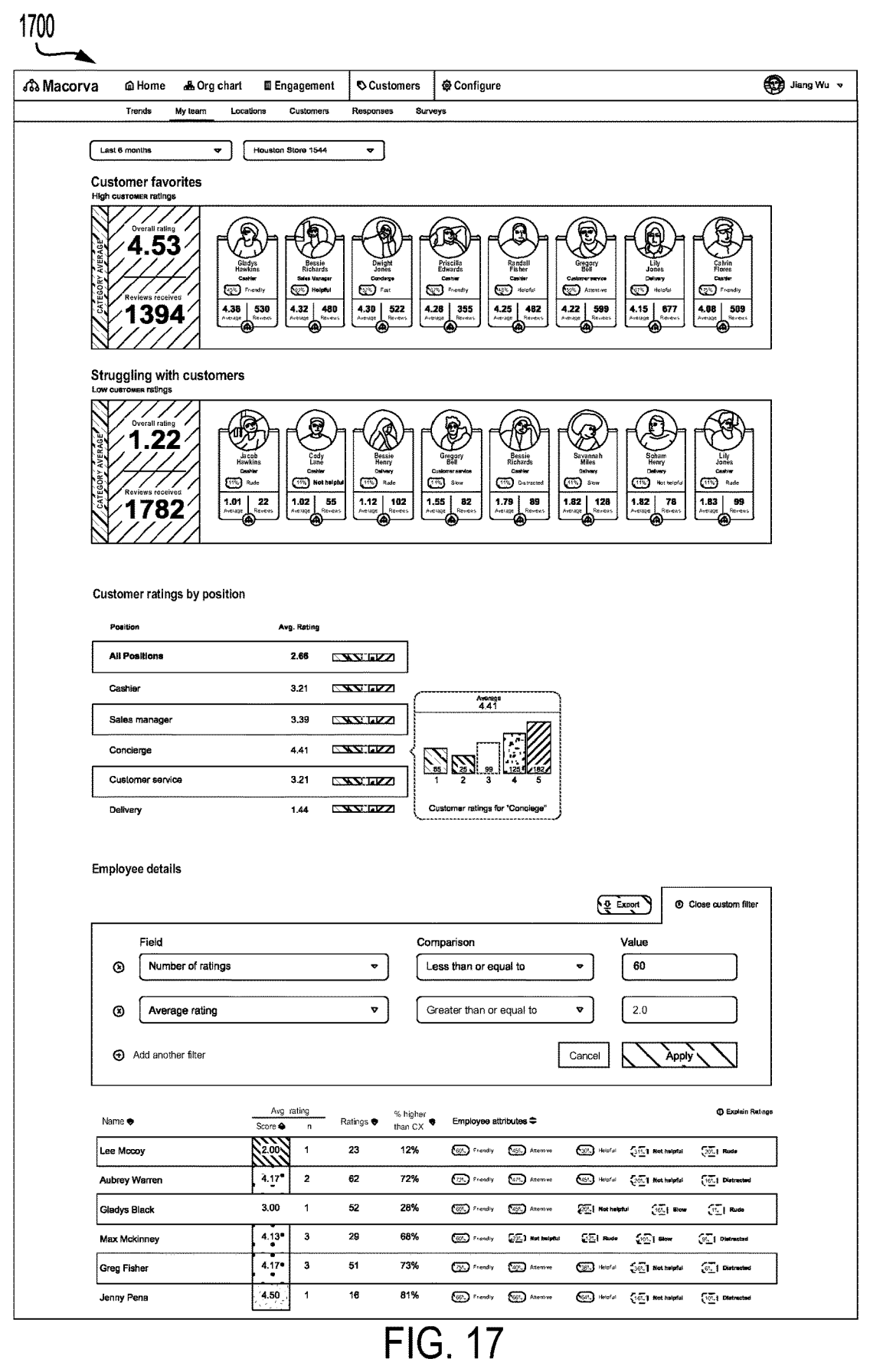

FIG. 17 shows a GUI 1700 for the "My Team" sub-tab under the "Customers tab. The layout can parallel in part the presentation of "Customers" and "Locations" (shown in FIGS. 15 and 16, respectively).

"Customer favorites" can display information about favorite employees as rated by customers. Further, customer favorites can include average ratings as well as an average number of reviews received. In addition to aggregated statistics, information about individual employees can be presented. Such information can include average customer rating, number of reviews, as well as a top attribute used to describe an individual employee and the frequency with which it is assigned in reviews. Employee photos can be shown for ease of recognition. "Struggling with customers" can parallel the information in customer favorites, but instead can show employees with low ratings. These displayed employee categorizations can be different on different GUIs.

"Customer ratings by position" can break down average employee ratings by sub-groups, such as job title. "Position" can list the job title while "Avg. rating" can show the average rating for employees in that position. Graphics can be displayed which show the frequency of ratings on a 1 to 5 scale, using colors, bar graphs, or other data visualization techniques. In some embodiments, these data can include projections of future customer ratings.

"Employee details" can show information about specific employees. Field filters can be employed using a drop-down menu, and thresholds can be set to limit the employee information displayed. Data can be exported to a file for later consumption or analysis. In the table, displayed information can include employee name, average rating, number of ratings, the percentage of ratings higher than the overall customer experience, and top attributes with their frequency of mentions in customer reviews.

Figure 18:
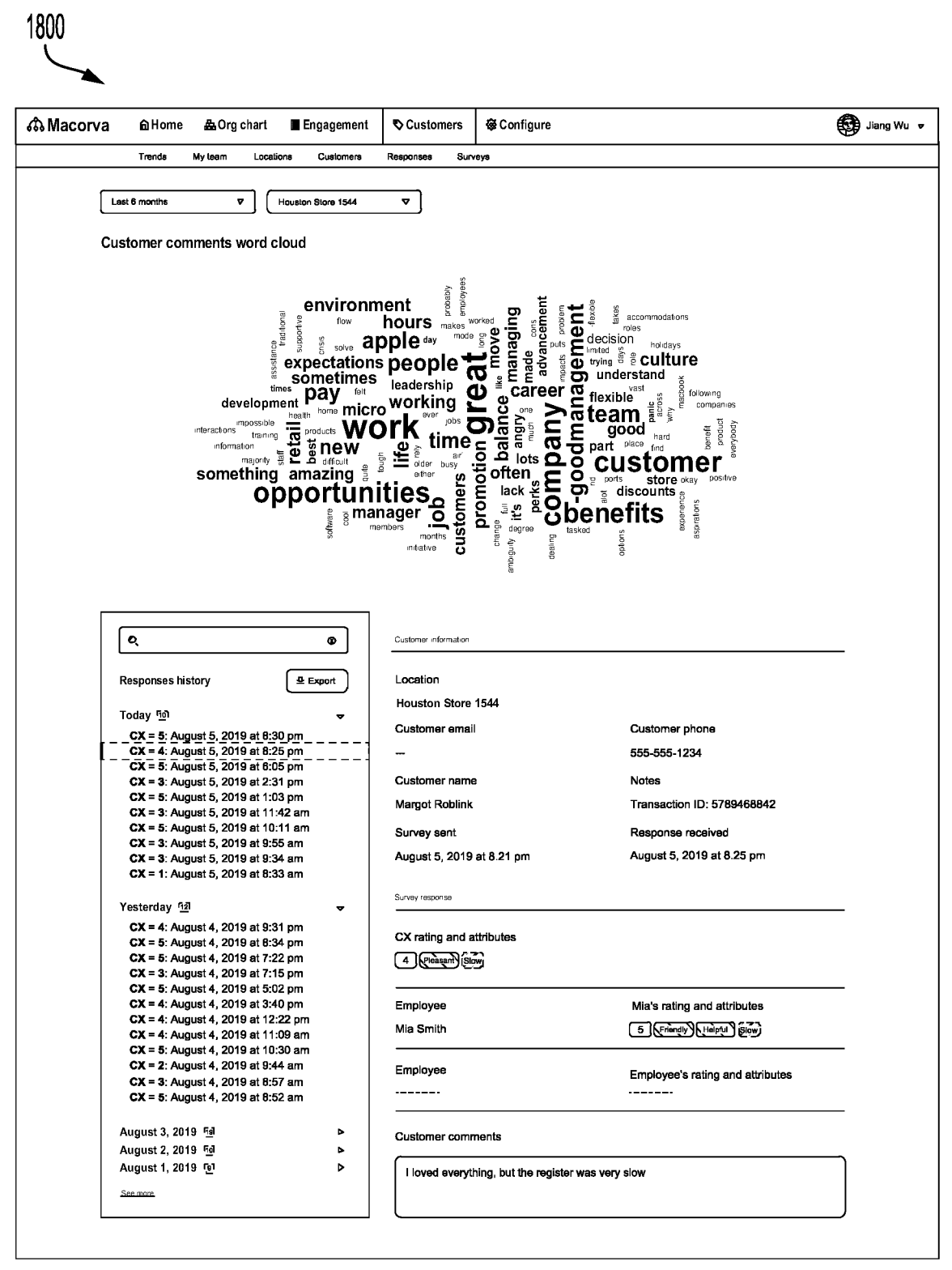

FIG. 18 shows a GUI 1800 for the "Responses" sub-tab under the "Customers" tab. "Customer comments word cloud" can show a word-cloud using words mined from customer comments. The set of words chosen can be limited by time and location by using two drop-down menus.

"Responses history" can contain customer experiences from the selected locations in the selected timeframes. It can provide a list of customer experiences with details including customer experience scores, dates, and times. These data can be exported for later consumption or analysis. A search bar can allow for specific customer experiences to be sought out.

When an individual customer experience is selected, the display can show more in-depth information. Such information can include location, customer email, customer phone, customer name, notes, when the survey was sent, when the response was received, customer experience rating and attributes, employee name, employee rating and attributes, and customer comments.

Figure 19:
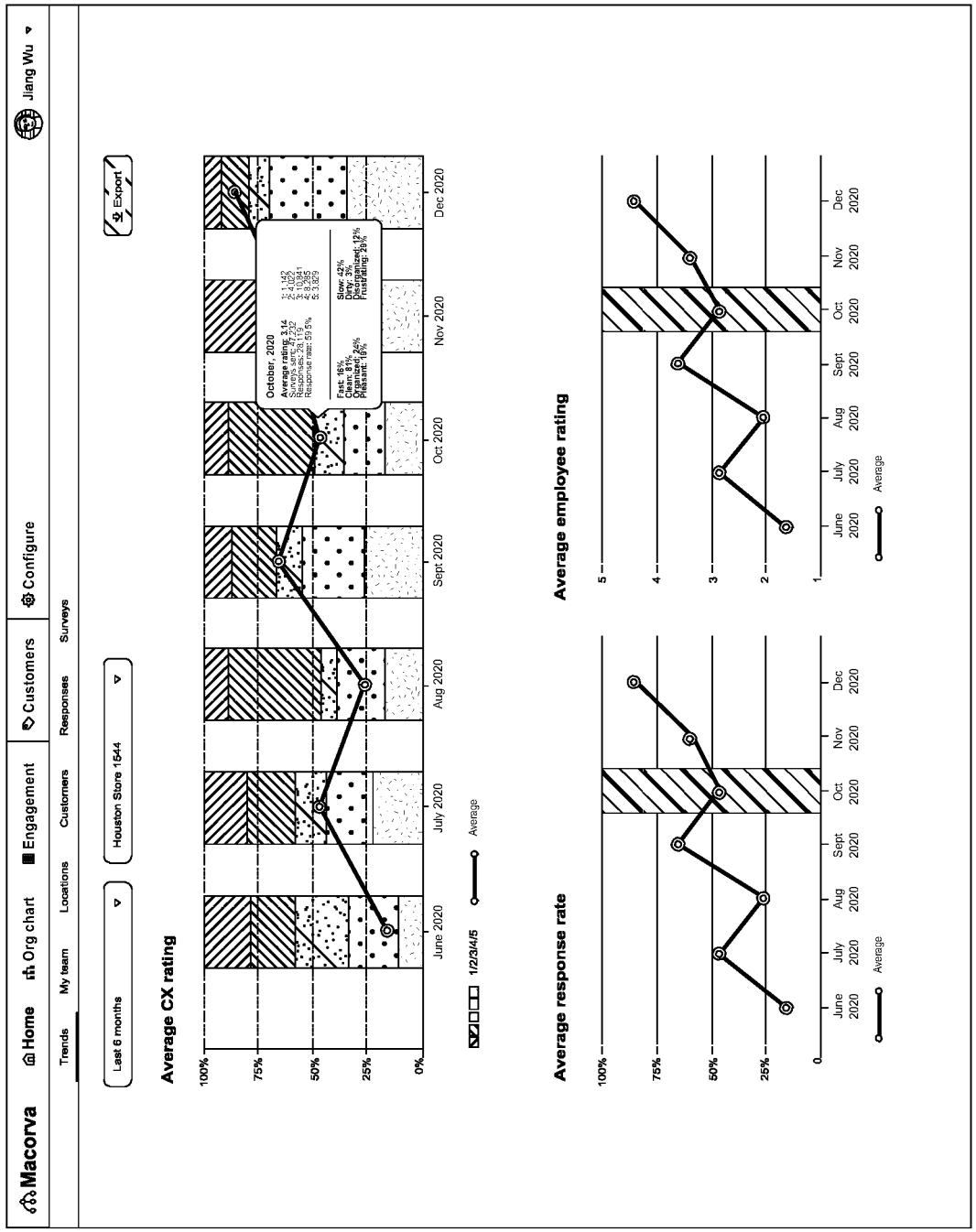

FIG. 19 shows a GUI 1900 for the "Trends" sub-tab under the "Customers" tab. Like other aspects of the GUI, data can be filtered by time and location, and can be exported for later consumption or analysis.

"Average CX Rating" can show customer experience rating trends through time. Ratings (1 through 5) can be color coded and stacked in a bar graph, where data can be aggregated by month or by other time bins. The blue line and points can track the average rating over time, showing the trends. Clicking on an individual average point can reveal more detailed information for that time bin: average rating, surveys sent, responses, response rate, number of each rating 1 through 5, and top positive and negative attributes.

"Average response rate" can show the average rate of response for customer surveys over the time period specified, aggregated by a specified time bin such as week, month, or business quarter. "Average employee rating" can do the same for employee ratings. Clicking on an individual average point can reveal more detailed information for that time bin.

Figure 20:
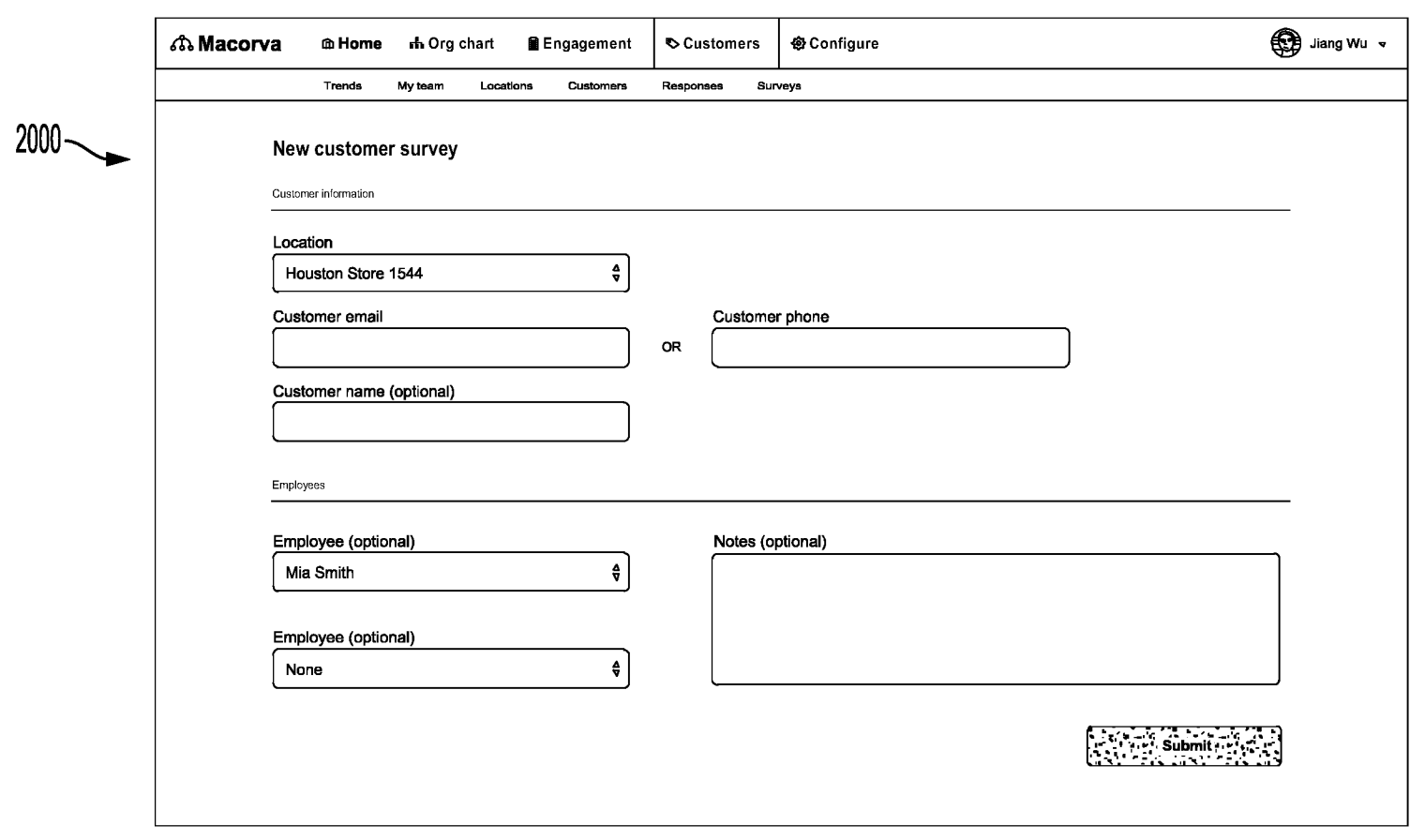

FIG. 20 shows a GUI 2000 for the "Surveys" sub-tab under the "Customers" tab. "New customer survey" can allow a user to submit a survey to a customer for completion. Fields to specify can include location, customer email, customer phone number, customer name, employee (singular or plural), and notes. Clicking "Submit" can send the survey to the specified customer for completion.

Figure 21:
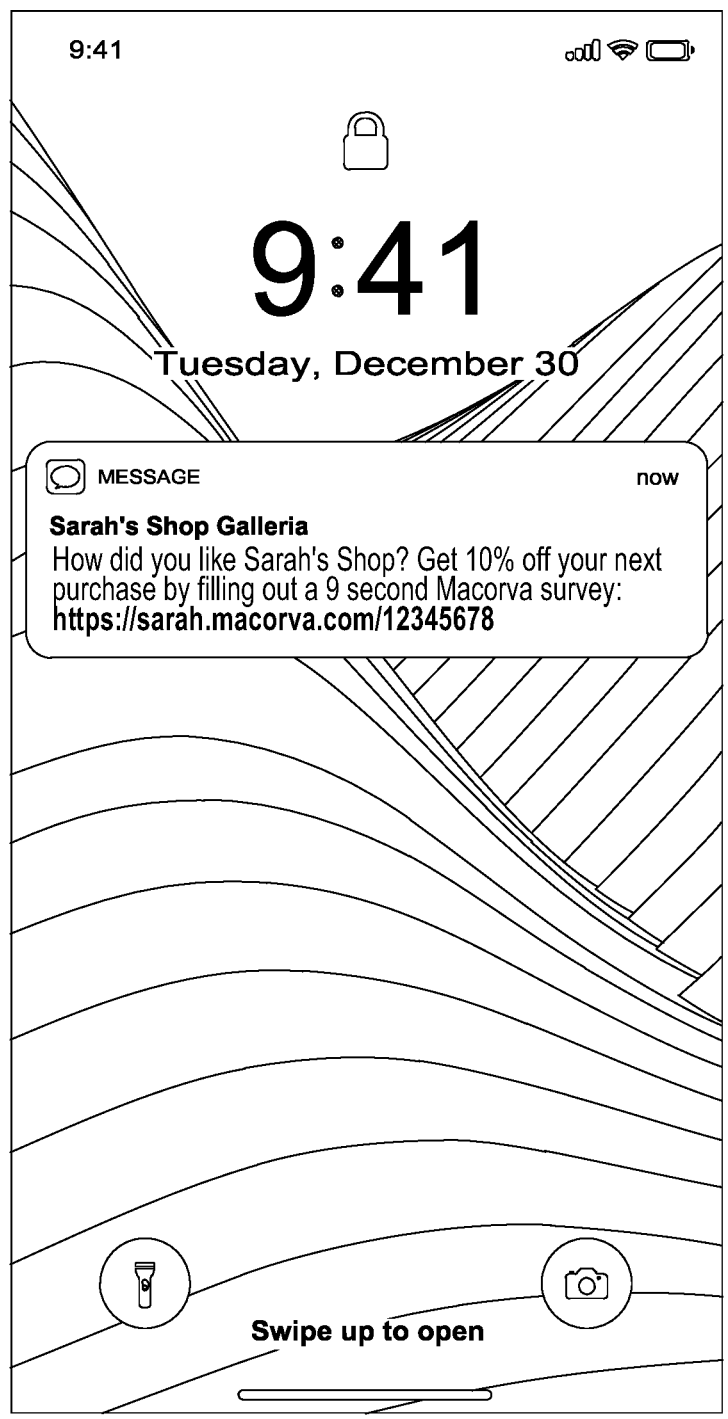
FIGS. 21-22 illustrate an example graphical user interface (GUI) for a customer according to embodiments of the present technology.

FIG. 21 shows a customer mobile device GUI 2100 with a notification inviting the customer to complete a customer experience survey. The notification can include the name of the business, a message asking for feedback, and a link to the survey. The notification can be sent via the GUI shown in FIG. 20.

Figure 22:

FIG. 22 shows a customer mobile device GUI 2200 after following the survey invitation presented in FIG. 21. Customers can be shown the name of the shop and can rate their experience on a scale of 1 to 5 by selecting the appropriate button. Descriptive attributes can be selected in the same manner, and more than one can be selected. Customers can further be shown the name of the employee who facilitated their customer experience, and can describe their experience on a scale of 1 to 5. Attributes can be added similarly to the attributes of the business as a whole.

In some embodiments, the customer survey responses can be combined with employee feedback data and employee engagement data to generate an ordered list of recommended actions for each individual employee. As portions of the customer survey responses, employee feedback data, and employee engagement data are specific to individual employees, these recommended actions can be specifically-tailored unique to teach employee. A combination of manual analysis and automated analysis using artificial intelligence, machine learning, or other models, can order the list of recommended actions.

Certain recommended actions can apply to specific categories of employees. For example, all employees with certain attributes, all manages in departments with specific problems mentioned in customer survey data, or all standout performers may receive category-specific recommended actions. By using the combination of employee feedback data, employee engagement data, and customer survey response data to recommend specific actions for employees, this embodiment can automate portions of enterprise improvement. Because it is automated, it can also be tweaked, used for A/B testing, or otherwise manipulated to optimize results.

Figure 23:
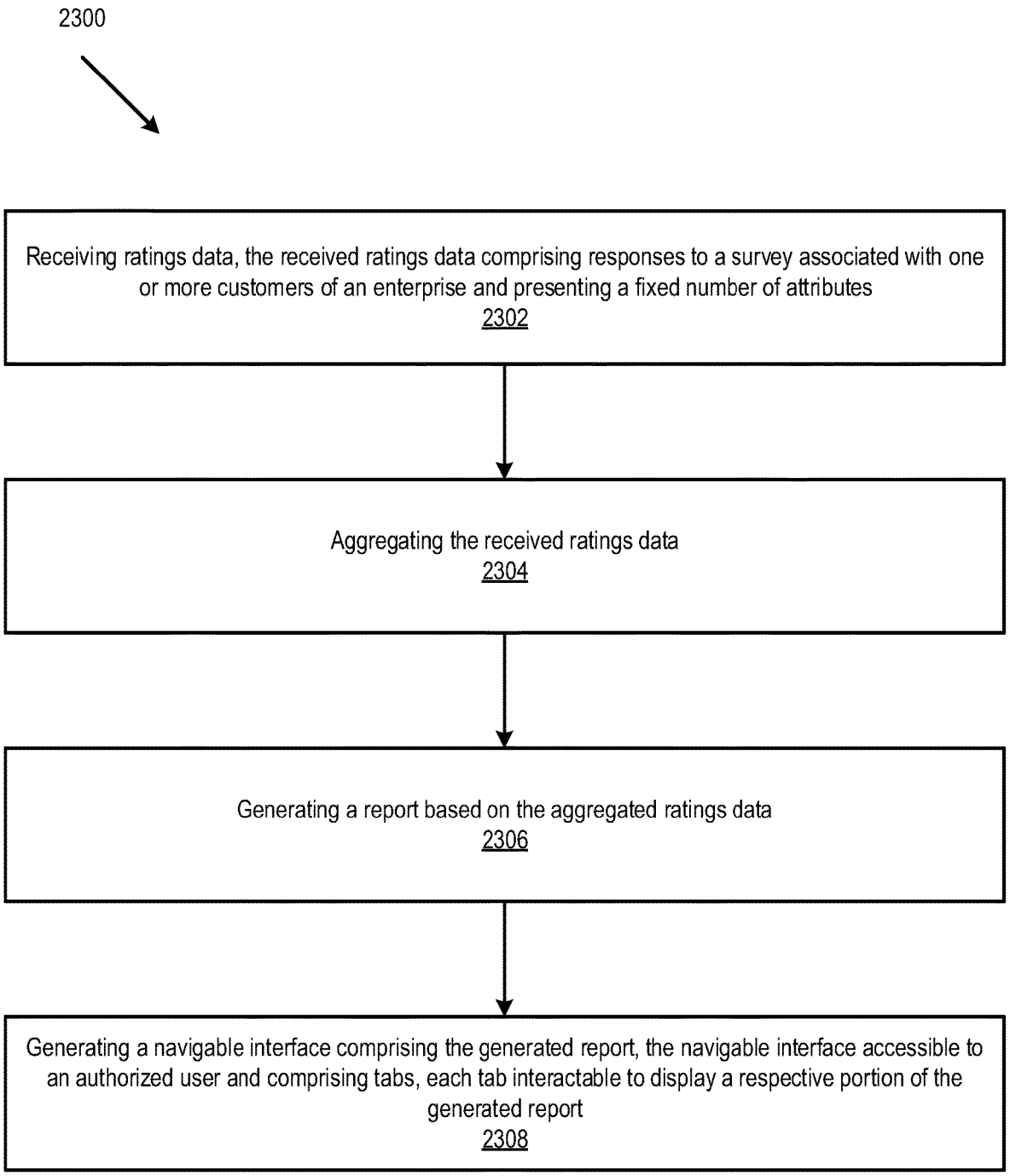
FIG. 23 illustrates a flowchart for a method for determining customer sentiment ratings.

FIG. 23 illustrates an example method 2300 for determining customer sentiment ratings. Although the example method 2300 depicts a particular sequence of operations, the sequence may be altered without departing from the scope of the present disclosure. For example, some of the operations depicted may be performed in parallel or in a different sequence that does not materially affect the function of the method 2300. In other examples, different components of an example device or system that implements the method 2300 may perform functions at substantially the same time or in a specific sequence.

According to some examples, the method includes receiving ratings data, the received ratings data comprising responses to a survey associated with one or more customers of an enterprise and presenting a fixed number of attributes at step 2302. The received ratings data can be uniquely associated with the one or more customers. The received ratings data can comprise one or more of an overall experience rating, one or more overall experience attributes, a brand perception rating, one or more brand perception attributes, a product experience rating, one or more product experience attributes, an employee rating, one or more employee attributes, or notes. The survey can include a numeric rating scale for quantifying a customer sentiment. The middle number of the numeric rating scale can be presented as visually larger in a presentation of the survey. The received ratings data can be pursuant to an employee and can be added to a record for the employee.

In another example of the receiving ratings data at step 2302, the method comprises receiving survey parameters, the survey parameters identifying the one or more customers. Further, the method comprises sending, to accounts or devices associated with the one or more customers, a request to respond to the survey.

According to some examples, the method includes aggregating the received ratings data at block 2304.

According to some examples, the method includes generating a report based on the aggregated ratings data at block 2306.

In another example of block 2306, the method comprises analyzing attributes whose attribute frequency rates are above an attribute frequency threshold. Further, the method comprises dynamically adjusting attribute presentation rates in the survey based in part on the attribute frequency rates for the attributes. The method can include using attributes whose attribute frequency rates in open comments are above an open-comment attribute frequency threshold to generate additions to the attribute list. The method can include tracking the attribute frequency rates for the attributes from the attribute list and removing attributes from the attribute list whose attribute frequency rates are below an attribute frequency removal threshold. The method can include using artificial intelligence or manual analysis combined with the survey, sales data, employee data, or the received ratings data to guide generation of the attribute list. The method can include using varied analysis techniques for different geographic regions or different demographic populations and dynamically varying the attribute presentation rates based in part on the varied analysis techniques, the different geographic regions, or the different demographic populations.

In another example of block 2306, the method comprises generating respective scores for one or more employees of the enterprise, each respective score based at least in part on one or more responses to the survey. Further, the method comprises categorizing the one or more employees into performance categories based on the respective scores. Further, the method comprises generating a projected performance for the one or more employees based on the respective scores or the performance categories.

In another example of block 2306, the method comprises generating respective scores for one or more branches of the enterprise, each respective score based at least in part on or more responses to the survey. Further, the method comprises categorizing the one or more branches into performance categories based on the respective scores. Further, the method comprises generating a projected performance for the one or more branches based on the respective scores or the performance categories.

According to some examples, the method includes generating a navigable interface comprising the generated report, the navigable interface accessible to an authorized user and comprising tabs, each tab interactable to display a respective portion of the generated report at block 108. The at least one interactable element displayed by at least one of the tabs can allow the authorized user to generate a new survey. The respective portions of the generated report displayed by the tabs can contain at least one interactable element.

In another example of block 2308, the method comprises displaying the respective scores or the performance categories associated with the one or more employees.

In another example of block 2308, the method comprises displaying the respective scores or the performance categories associated with the one or more branches.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer implemented method of analyzing ratings of employees within an enterprise for improving the organizational structure of the enterprise, the method comprising:

receiving, by a computer system, ratings data, the received ratings data comprising responses to a survey associated with one or more employees of the enterprise and the received ratings data presenting a fixed number of attributes, wherein the one or more employees are within the same or different departments within the enterprise;

aggregating, by the computer system, the received ratings data in a database to produce aggregated ratings data;

loading and flattening, by the computer system, a data structure into the database, wherein the data structure defines relationships between the one or more employees;

producing, by the computer system, a navigable data structure from the data structure;

associating, by the computer system, the aggregated ratings data with the data elements representing the one or more employees arranged in the navigable data structure;

generating, by the computer system, a report based on the aggregated ratings data and the navigable data structure, comprising:
analyzing, from the received ratings data, the attributes whose attribute frequency rates are above an attribute frequency threshold;
generating an attribute list from the attributes whose attribute frequency rates are above the attribute frequency threshold; and
dynamically adjusting attribute presentation rates from the responses to the survey for presentation in the report based in part on the attribute frequency rates for the attributes in the received ratings data; and generating, by the computer system, a navigable interface comprising the generated report, the navigable interface accessible to an authorized user and comprising tabs, each tab interactable to display a respective portion of the generated report and associated with the one or more employees within the same departments or the different departments within the enterprise, wherein generating the navigable interface further comprises:
generating, by the computer system, as a portion of the generated report in the navigable interface, respective above-below-inside-outside (ABIO) scores for the one or more employees of the enterprise from the aggregated ratings data, wherein a set of the respective ABIO scores associated with an employee of the one or more employees is generated from the ratings data received from other employees above the employee, other employees below the employee, other employees inside a department of the employee, and other employees outside the department of the employee, wherein association of the other employees to the employee is determined from the navigable data structure;
automatically categorizing, by the computer system, the employee as an employee type based on the set of the respective ABIO scores over a plurality of survey periods;
rendering and displaying, by the computer system, the set of the respective ABIO scores for the employee in the navigable interface as a current period snapshot including a corresponding set of change parameters from historical ABIO scores of the employee for past periods of the plurality of survey periods;
the generated navigable interface including categories of department statistics and corresponding icons;
detecting, by the computer system, an interaction on the navigable interface with one of the icons in the generating report; and
displaying, by the computer system, in response to the detected interaction with the one of the icons, a sub-window within and layered over the generated report, the sub-window including additional information related to the category of department statistic that corresponds to the one of the icons.

2. The method of claim 1, wherein the received ratings data comprise one or more of an overall experience rating, one or more overall experience attributes, an employee rating, one or more employee attributes, or notes.

3. The method of claim 2, wherein the received ratings data pursuant to an employee are added to a record for the employee.

4. The method of claim 1, further comprising:
using the attributes, from the received ratings data, whose attribute frequency rates in open comments are above an open-comment attribute frequency threshold to generate additions to the attribute list.

5. The method of claim 1, further comprising:
tracking the attribute frequency rates for the attributes from the attribute list; and
removing a subset of the attributes from the attribute list whose attribute frequency rates are below an attribute frequency removal threshold.

6. The method of claim 1, further comprising:
applying one or more algorithms implementing artificial intelligence or machine learning to the survey, sales data, employee data, or the received ratings data to generate or alter the attribute list.

7. The method of claim 1, further comprising:
using varied analysis techniques for different geographic regions or different demographic populations; and
dynamically varying the attribute presentation rates in the report based in part on the varied analysis techniques, the different geographic regions, or the different demographic populations.

8. The method of claim 1, further comprising, prior to receiving the ratings data comprising responses to the survey:
receiving survey parameters, the received survey parameters identifying the one or more employees;
generating a survey interface based on the received survey parameters, wherein the survey interface is structured for scaling to a user device upon which the survey is loaded; and
sending, to accounts or user devices associated with the one or more employees, a request to respond to the survey, wherein receipt of the survey by a particular user device causes the particular user device to display the survey interface.

9. The method of claim 1, wherein the respective portions of the generated report displayed by the tabs contain at least one interactable element.

10. The method of claim 9, wherein the at least one interactable element displayed by at least one of the tabs allows the authorized user to generate a new survey.

11. The method of claim 1, further comprising:
generating respective scores for the one or more employees of the enterprise, each respective score based at least in part on one or more responses to the survey;

categorizing the one or more employees into performance categories based on the respective scores; and
displaying the respective scores or the performance categories associated with the one or more employees.

12. The method of claim 11, further comprising:
generating a projected performance for the one or more employees based on the respective scores or the performance categories.

13. The method of claim 1, further comprising:
generating respective scores for one or more branches of the enterprise, each respective score based at least in part on one or more responses to the survey;
categorizing the one or more branches into performance categories based on the respective scores; and
displaying the respective scores or the performance categories associated with the one or more branches.

14. The method of claim 13, further comprising:
generating a projected performance for the one or more branches based on the respective scores or the performance categories.

15. The method of claim 1, wherein the survey includes a numeric rating scale for quantifying an employee sentiment, and wherein the middle number of the numeric rating scale is presented as visually larger in a presentation of the survey.

16. The method of claim 1, further comprising:
generating a list of recommended actions for an employee based on the received ratings data and employee data; and
automatically ordering the list of recommended actions using, in part, artificial intelligence and machine learning, based in part on a category of the employee type.

17. A system for analyzing ratings of employees within an enterprise and improving the organizational structure of the enterprise, the system comprising:
one or more processors; and
at least one non-transitory computer-readable medium having stored therein instructions that, when executed by the one or more processors, cause the system to:
receive ratings data, the received ratings data comprising responses to a survey associated with one or more employees of the enterprise and the received ratings data presenting a fixed number of attributes, wherein the one or more employees are within the same or different departments within the enterprise;
aggregate the received ratings data in a database to produce aggregated ratings data;
load and flatten a data structure into the database, wherein the data structure defines relationships between the one or more employees;
produce a navigable data structure from the data structure;
associate the aggregated ratings data with the data elements representing the one or more employees arranged in the navigable data structure;
generate a report based on the aggregated ratings data and the navigable data structure, comprising:
analyze, from the received ratings data, the attributes whose attribute frequency rates are above an attribute frequency threshold;
generate an attribute list from the attributes whose attribute frequency rates are above the attribute frequency threshold; and
dynamically adjust attribute presentation rates from the responses to the survey for presentation in the report based in part on the attribute frequency rates for the attributes in the received ratings data; and
generate a navigable interface comprising the generated report, the navigable interface accessible to an authorized user and comprising tabs, each tab interactable to display a respective portion of the generated report and associated with the one or more employees within the same departments or the different departments within the enterprise, wherein, to generate the navigable interface, execution of the instructions by the one or more processors further causes the system to:
generate, as a portion of the generated report in the navigable interface, respective above-below-inside-outside (ABIO) scores for the one or more employees of the enterprise from the aggregated ratings data, wherein a set of the respective ABIO scores associated with an employee of the one or more employees is generated from the ratings data received from other employees above the employee, other employees below the employee, other employees inside a department of the employee, and other employees outside the department of the employee, wherein association of the other employees to the employee is determined from the navigable data structure;
automatically categorize the employee as an employee type based on the set of the respective ABIO scores over a plurality of survey periods; and
render and display the set of the respective ABIO scores for the employee in the navigable interface as a current period snapshot including a corresponding set of change parameters from historical ABIO scores of the employee for past periods of the plurality of survey periods;
the generated navigable interface including categories of department statistics and corresponding icons;
detect an interaction on the navigable interface with one of the icons in the generating report; and
display, in response to the detected interaction with the one of the icons, a sub-window within and layered over the generated report, the sub-window including additional information related to the category of department statistic that corresponds to the one of the icons.

18. A non-transitory computer-readable medium having stored therein instructions that, when executed by a processor, cause the processor to perform operations comprising:
receiving ratings data, the received ratings data comprising responses to a survey and associated with one or more employees of the enterprise and the received ratings data presenting a fixed number of attributes, wherein the one or more employees are within the same or different departments within the enterprise;
aggregating the received ratings data in a database to produce aggregated ratings data;
loading and flattening a data structure into the database, wherein the data structure defines relationships between the one or more employees;
producing a navigable data structure from the data structure;
associating the aggregated ratings data with the data elements representing the one or more employees arranged in the navigable data structure;

generating a report based on the aggregated ratings data and the navigable data structure, comprising:

analyzing, from the received ratings data, the attributes whose attribute frequency rates are above an attribute frequency threshold;

generating an attribute list from the attributes whose attribute frequency rates are above the attribute frequency threshold; and dynamically adjusting attribute presentation rates from the responses to the survey for presentation in the report based in part on the attribute frequency rates for the attributes in the received ratings data; and generating a navigable interface comprising the generated report, the navigable interface accessible to an authorized user and comprising tabs, each tab interactable to display a respective portion of the generated report and associated with the one or more employees within the same departments or the different departments within the enterprise, wherein the operations for generating the navigable interface further comprise:

generating, as a portion of the generated report in the navigable interface, respective above-below-inside-outside (ABIO) scores for the one or more employees of the enterprise from the aggregated ratings data, wherein a set of the respective ABIO scores associated with an employee of the one or more employees is generated from the ratings data received from other employees above the employee, other employees below the employee, other employees inside a department of the employee, and other employees outside the department of the employee, wherein association of the other employees to the employee is determined from the navigable data structure;

automatically categorizing the employee as an employee type based on the set of the respective ABIO scores over a plurality of survey periods; and rendering and displaying the set of the respective ABIO scores for the employee in the navigable interface as a current period snapshot including a corresponding set of change parameters from historical ABIO scores of the employee for past periods of the plurality of survey periods;

the generated navigable interface including categories of department statistics and corresponding icons;

detecting an interaction on the navigable interface with one of the icons in the generating report; and displaying, in response to the detected interaction with the one of the icons, a sub-window within and layered over the generated report, the sub-window including additional information related to the category of department statistic that corresponds to the one of the icons.

* * * * *